(12) United States Patent
Son

(10) Patent No.: US 9,854,613 B2
(45) Date of Patent: Dec. 26, 2017

(54) DISPLAY DEVICE AND METHOD OF SETTING THE SAME

(71) Applicant: SAMSUNG ELECTRONICS CO., LTD., Suwon-si, Gyeonggi-do (KR)

(72) Inventor: Ho-yong Son, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 97 days.

(21) Appl. No.: 15/094,311

(22) Filed: Apr. 8, 2016

(65) Prior Publication Data

US 2016/0302244 A1 Oct. 13, 2016

(30) Foreign Application Priority Data

Apr. 13, 2015 (KR) .................. 10-2015-0052079

(51) Int. Cl.
*H04W 76/02* (2009.01)
*H04L 29/12* (2006.01)
*G06F 3/14* (2006.01)
*G09G 5/00* (2006.01)

(52) U.S. Cl.
CPC ............ *H04W 76/021* (2013.01); *G06F 3/14* (2013.01); *G06F 3/1446* (2013.01); *G09G 5/003* (2013.01); *H04L 61/6022* (2013.01); *G09G 2320/08* (2013.01); *G09G 2370/042* (2013.01)

(58) Field of Classification Search
CPC ...... H04W 76/021; G06F 3/14; G06F 3/1446; G09G 5/003; G09G 2320/08; G09G 2370/042; H04L 61/6022
See application file for complete search history.

(56) References Cited

U.S. PATENT DOCUMENTS

| | | | |
|---|---|---|---|
| 2009/0138921 A1* | 5/2009 | Miyata | H04L 12/2812 725/80 |
| 2009/0265455 A1 | 10/2009 | Hiraki | |
| 2009/0274065 A1 | 11/2009 | Jin et al. | |
| 2010/0274924 A1 | 10/2010 | Allan et al. | |
| 2010/0281360 A1* | 11/2010 | Arakane | G06F 3/0482 715/244 |

(Continued)

FOREIGN PATENT DOCUMENTS

| | | |
|---|---|---|
| KR | 10-2013-0123506 | 11/2013 |
| WO | 2003/055180 | 7/2003 |
| WO | 2014/203113 | 12/2014 |

OTHER PUBLICATIONS

Extended European Search Report dated Sep. 13, 2016 in counterpart European Patent Application No. 16164958.7.

(Continued)

*Primary Examiner* — Duc C Ho
(74) *Attorney, Agent, or Firm* — Nixon & Vanderhye, P.C.

(57) ABSTRACT

A display device configured to communicate with at least one other display device connected to a network is disclosed. The display device includes communication circuitry configured to receive unique information and a service set identifier (SSID) from each of the at least one other display device, the unique information for use in identification of each of the at least one other display device, and a controller configured to change an SSID based on a comparison between unique information of the display device and at least one piece of the received unique information.

20 Claims, 20 Drawing Sheets

(56) References Cited

U.S. PATENT DOCUMENTS

| | | | |
|---|---|---|---|
| 2011/0099578 A1* | 4/2011 | Kim | H04N 21/238 |
| | | | 725/40 |
| 2012/0256738 A1 | 10/2012 | Egawa | |
| 2013/0297839 A1 | 11/2013 | Chai et al. | |
| 2015/0095486 A1 | 4/2015 | Gossain et al. | |
| 2015/0296247 A1* | 10/2015 | Glasser | H04L 65/4084 |
| | | | 725/74 |

OTHER PUBLICATIONS

Search Report dated Jul. 1, 2016 in counterpart International Patent Application No. PCT/KR2016/003592.

* cited by examiner

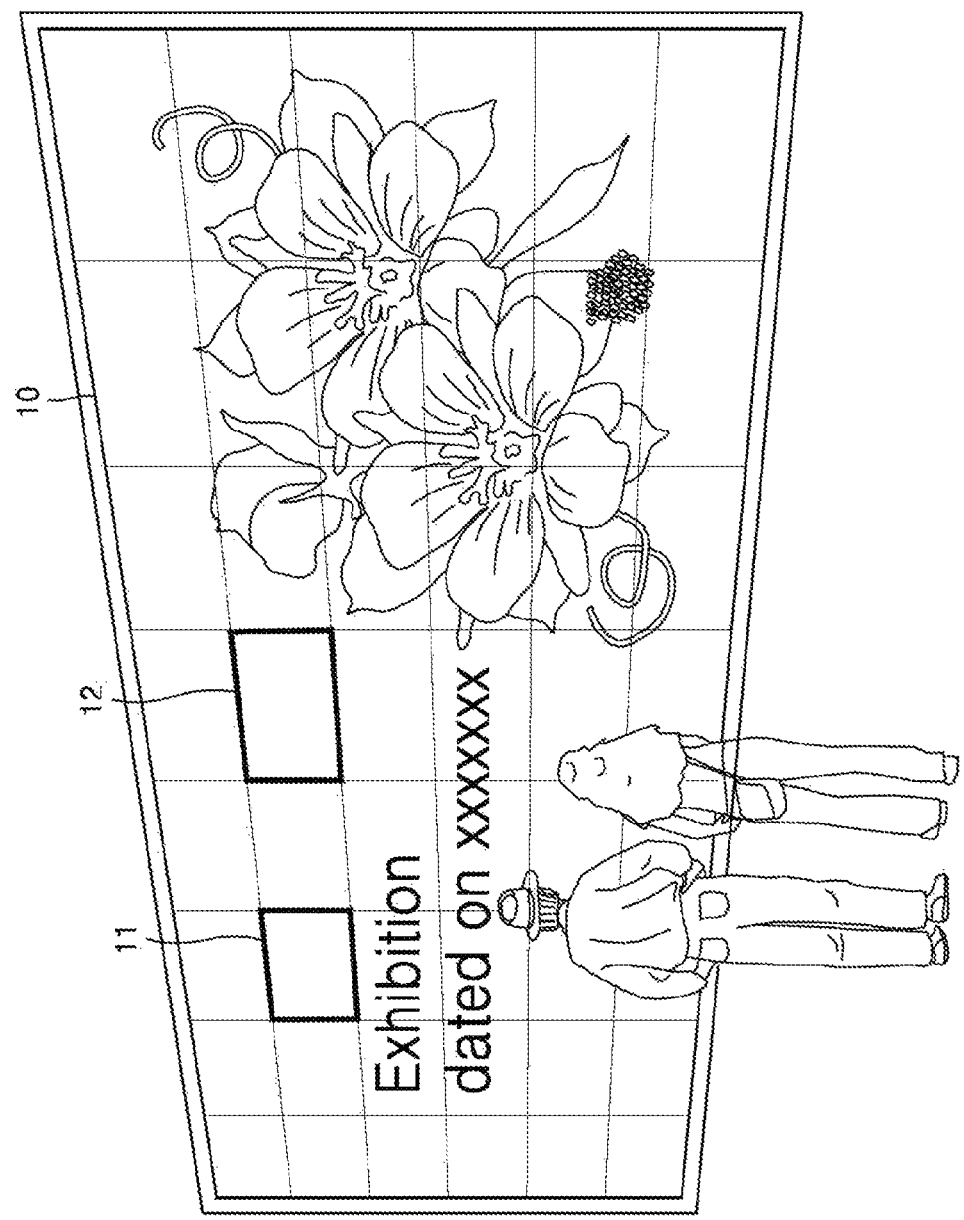

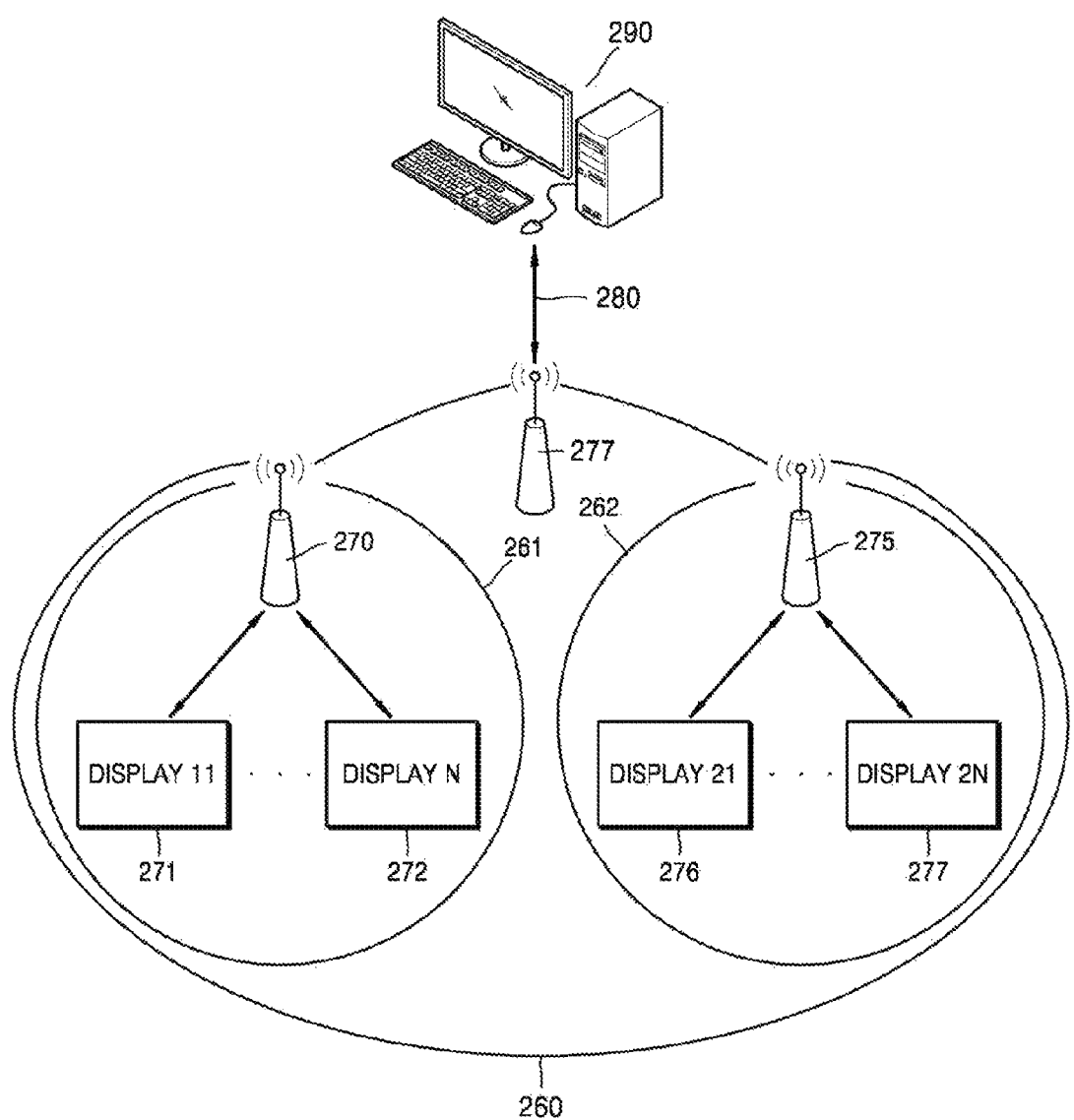

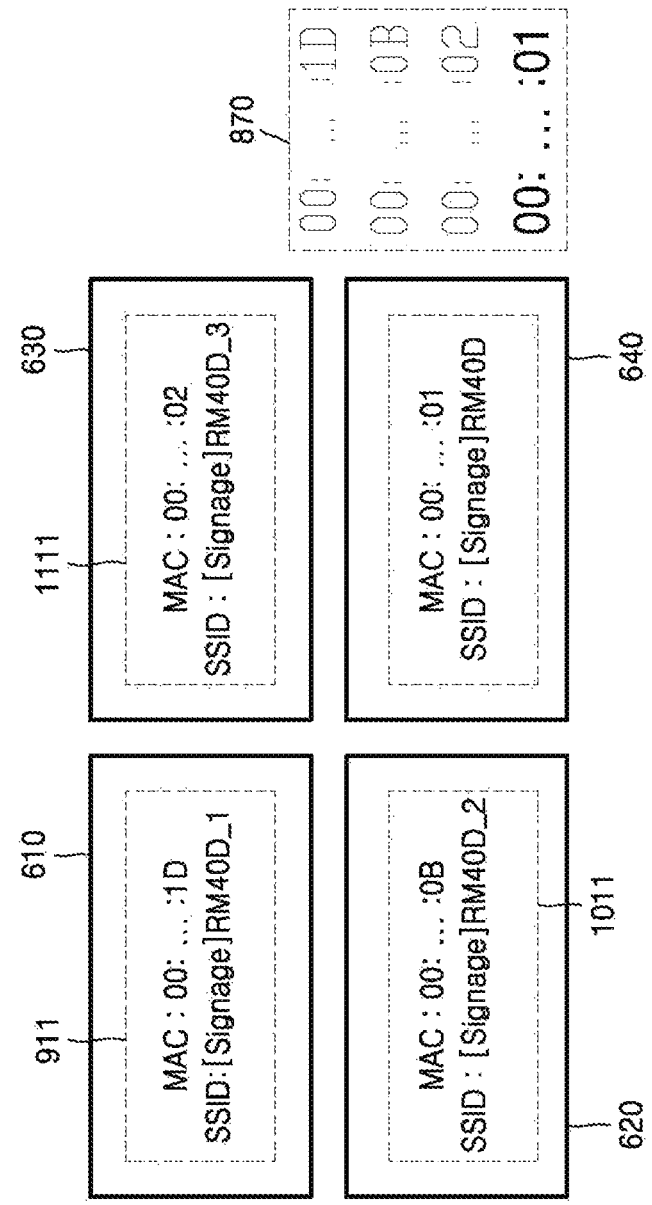

DISPLAY DEVICE AND METHOD OF SETTING THE SAME

CROSS-REFERENCE TO RELATED APPLICATION

This application is based on and claims priority under 35 U.S.C. §119 to Korean Patent Application No. 10-2015-0052079, filed on Apr. 13, 2015, in the Korean Intellectual Property Office, the disclosure of which is incorporated by reference herein in its entirety.

BACKGROUND

1. Field

The present disclosure relates generally to a display device and a method of setting the same, and for example, to a display device which sets a service set identifier (SSID) and a method of setting an SSID in the display device.

2. Description of Related Art

A display device is a device having a function of displaying an image which may be viewed by a user. For example, in the past, most display devices only functioned to unidirectionally receive a broadcast signal transmitted by a broadcasting station and display a broadcast image. However, current display devices provide a function of outputting a variety of image content as well as a broadcast image received from a broadcasting station.

Also, the development of display devices has caused the display devices to be used as a video wall, etc. which delivers advertisements and guide information not only in homes but also in situation control rooms of police stations, fire stations, weather service centers, military bases, lobbies of shopping malls, and so on.

As an example of a display device which is used to deliver advertisements and guide information as mentioned above, there is a large format display (LFD) device which has a larger size than a general display device and is mainly used for commercial purposes to play advertising content. The LFD device may be used as a video wall, etc. which delivers advertisements and guide information in a lobby of a shopping mall to play advertising content and so on. In general, a video wall, etc. includes a plurality of identical LFD devices.

It is necessary to enable a user to conveniently set and use such a plurality of identical LFD devices.

SUMMARY

A display device capable of increasing a user's convenience and a method of setting the display device are provided.

Example disclosed embodiments provide a display device capable of addressing the problem of duplication of a service set identifier (SSID) which occurs when a plurality of identical display devices are used, and a method of setting the display device.

Additional aspects will be set forth in part in the description which follows and, in part, will be apparent from the description.

According to an aspect of an example embodiment, a display device able to communicate with at least one other display device connected to a network includes: a display, communication circuitry configured to receive unique information and an SSID from each of the at least one other display device, the unique information for use in identification of each of the at least one other display device, a memory configured to store at least one piece of the received unique information, and a controller configured to change an SSID of the display device based on a comparison between unique information of the display device and the at least one piece of unique information stored in the memory.

The controller may be configured to store unique information of at least one other display device having an SSID identical to the SSID of the display device among the at least one other display device in the memory.

When the unique information is generated in a certain-base notation, the controller may be configured to change the SSID based on a value of the unique information generated in the certain-base notation.

When the unique information is generated in a certain-base notation, the controller may be configured to change or not change the SSID based on a value of the unique information generated in the certain-base notation.

The unique information may include a media access control (MAC) address of the display device.

The controller may be configured to compare a value of the MAC address of the display device and a value of at least one MAC address corresponding to the at least one piece of unique information, and to determine whether to change the SSID based on a result of the comparison.

When the comparison indicates that the MAC address of the display device has the largest value among the values being compared, the controller may be configured to change the SSID.

When the comparison indicates that the MAC address of the display device has the smallest value among the values being compared, the controller may be configured to change the SSID.

When at least one of the at least one other display device is added or removed at a first point in time and the SSID of the display device has been changed before the first point in time, the controller may be configured to not change the SSID of the display device.

When the display device is added to the network at a first point in time and there is at least one display device whose SSID has not been changed before the first point in time among the at least one other display device, the controller may be configured to change the SSID of the display device based on a comparison between unique information of the at least one display device whose SSID has not been changed and the unique information of the display device.

When the SSID is changed, the controller may be configured to transmit information indicating the change to at least one of the at least one other display device.

When the display device is added to the network at a first point in time and an SSID of each of the at least one other display device has been changed before the first point in time, the controller may be configured to output a user interface screen related to the change of the SSID through the display.

The user interface screen may include information indicating that an SSID of each of the at least one other display device has been changed before the first point in time.

The user interface screen may include a user interface screen for setting whether to change the SSID.

The controller may be configured to update the SSID of the display device based on the comparison at predefined time intervals.

In response to a history indicating that a user has changed the SSID, the controller may be configured to not change the SSID.

When an SSID is changed in at least one of the at least one other display device, the controller may be configured to output a user interface screen indicating the change.

When the SSID of the display device is changed, the controller may be configured transmit information indicating the change to at least one of the at least one other display device.

When another display device is added to the network or at least one of the at least one other display device leaves the network, the controller may be configured to display a UI screen indicating the addition or the departure on the display.

According to an aspect of another example embodiment, a method of setting a display device able to communicate with at least one other display device connected to a network includes receiving, by the display device, unique information and an SSID from each of the at least one other display device, the unique information for use in identification of each of the at least one other display device, storing at least one piece of the received unique information, and changing an SSID of the display device based on a comparison between unique information of the display device and the stored at least one piece of unique information.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 1 is a diagram illustrating an example video wall employing large format displays (LFDs);

FIG. 2B is a diagram illustrating an example of a plurality of display devices present in a network;

FIG. 12 is a diagram illustrating an example of another SSID changing operation of the display device;

DETAILED DESCRIPTION

Figure 2A:
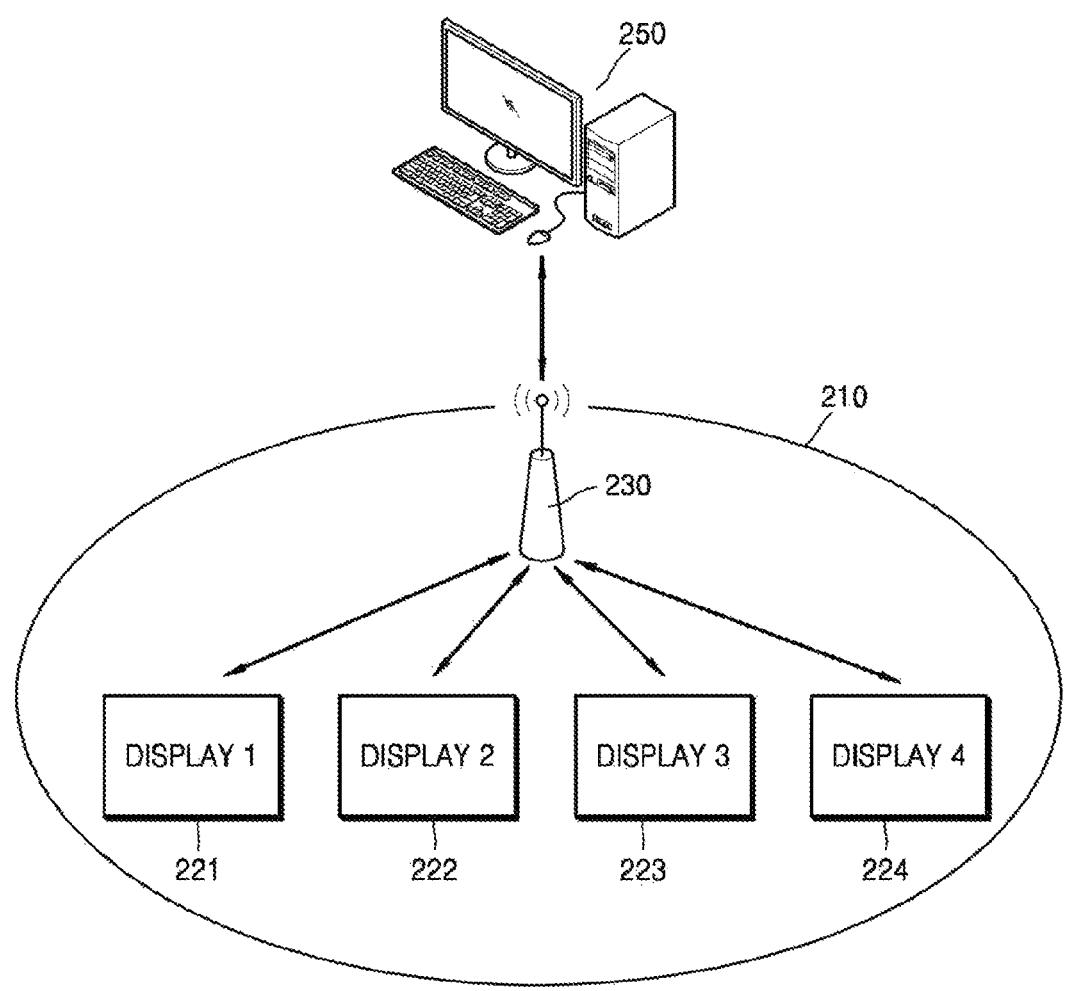
FIG. 2A is a diagram illustrating an example of a plurality of display devices present in one network.

Hereinafter, example embodiments of the present disclosure will be described in greater detail with reference to the accompanying drawings. Also, a method of configuring and using an electronic device according to an example embodiment of the present disclosure will be described in greater detail with reference to the accompanying drawings. Throughout the drawings, like reference numerals refer to like elements which perform substantially the same functions.

As used herein, terms including ordinal numbers, such as "first," "second," etc., may be used to represent various elements, but do not limit the corresponding elements. The terms are simply used for distinguishing one element from another element. For example, a first element may also be called a second element, and similarly, the second element may also be called the first element without departing from the scope of the present disclosure. The term "and/or" includes any or all combinations of a plurality of associated items.

A selection of a key in a control device may represent a press of the key, a touch on the key, or a drag of the key.

A portion of a display in which content is actually output in a display device may be referred to as a screen.

The terminology used herein is for the purpose of describing particular example embodiments only, and is not intended to limit the scope of the present disclosure. The singular forms "a," "an," and "the" include plural referents unless the context clearly indicates otherwise. It will be further understood that the terms "comprise," "comprising," "includes," and/or "including" when used herein, specify the presence of stated features, integers, steps, operations, elements, components, and/or combinations thereof, but do not preclude the presence or addition of one or more other features, integers, steps, operations, elements, components, and/or combinations thereof.

FIG. 1 is a diagram illustrating an example video wall employing large format displays (LFDs).

Display devices may be used to deliver advertisements and guide information in situation control rooms of police stations, fire stations, weather service centers, military bases, lobbies of shopping malls, and so on. As an example, an LFD device has a larger size than a general display device and is mainly used for commercial purposes to play advertising content. For example, a plurality of display devices, such as LFD devices, may be combined into a video wall for displaying one screen, or may be separately used in a stand-alone manner for displaying one screen through one panel. A plurality of display devices used in a stand-alone manner may also be disposed and used together in a certain space. Also, a display device, such as an LFD device, may be installed in a shopping mall, an airport, etc. to display various information, and may be used as digital signage or a digital information display (DID) for displaying advertising screens or guide screens.

Referring to FIG. 1, an example in which a plurality of display devices 11 and 12 are combined into one video wall 10 is illustrated. When the video wall 10 is formed, each of the plurality of display devices 11 and 12 may separately operate as an independent display device, and content to be separately displayed may be transmitted.

The video wall 10 including the plurality of display devices 11 and 12 may receive content to display through a network.

FIG. 2A is a diagram illustrating an example of plurality of display devices present in one network.

Referring to FIG. 2A, a plurality of display devices 221, 222, 223, and 224 present in a network 210 are illustrated. In other words, the plurality of display devices 221, 222, 223, and 224 may be connected to the network 210 and receive content for display through the network 210.

The plurality of display devices 221, 222, 223, and 224 may be the plurality of display devices 11 and 12 included in the video wall 10 described in FIG. 1.

For example, the plurality of display devices 221, 222, 223, and 224 may be used as display devices for playing advertising content. In this example, each of the plurality of display devices 221, 222, 223, and 224 receives advertising content from an external device 250, and may have an embedded program or embedded software for playing the received advertising content. For example, the advertising content may be transmitted through the network 210 which connects the external device 250 and the plurality of display devices 221, 222, 223, and 224. For example, the network 210 may be a wired or wireless network conforming to various network standards. For example, the network 210 may be a wireless network.

Also, each of the plurality of display devices 221, 222, 223, and 224 may receive content for display from the external device 250 through the network 210. A case in which the network 210 is a wireless fidelity (Wi-Fi) network conforming to a Wi-Fi communication standard and an access point (AP) 230 is used as a network relay device for connecting the network 210 and the external device 250 will be described below as an example.

Each of the plurality of display devices 221, 222, 223, and 224 may receive content for display from the external device 250 through the AP 230. For example, the external device 250 may transmit advertising content to the plurality of display devices 221, 222, 223, and 224 through the AP 230, which connects a wired local area network (LAN) and a wireless LAN (WLAN).

FIG. 2B is a diagram illustrating another example of a plurality of display devices present in a network.

A network 261 illustrated in FIG. 2B may correspond, for example, to the network 210 illustrated in FIG. 2A, and a network 262 illustrated in FIG. 2B may correspond, for example, to the network 210 shown in FIG. 2A. Also, an external device 290 may correspond, for example, to the external device 250 illustrated in FIG. 2A.

In FIG. 2B, an example in which a plurality of APs 270, 275, and 277 are connected to form a network 260 is illustrated as an example. For example, the plurality of APs may be connected to extend a wireless network formed by one AP, so that the network 260 which is an extended wireless network may be formed. The external device 290 may be configured to transmit, for example, advertising content to a plurality of display devices 271, 272, 276, and 277 through the network 260.

When the plurality of display devices 221, 222, 223, and 224 are connected to one AP 230 as illustrated in FIG. 2A, the external device 250 may transmit content to each of the plurality of display devices 221, 222, 223, and 224 using a plurality of distinguishable service set identifiers (SSIDs) separately corresponding to the plurality of display devices 221, 222, 223, and 224. For example, an SSID is a unique identifier having a length of 32 bits and added to a header of each packet transmitted through a WLAN.

Therefore, in order for the external device 250 to transmit advertising content to each of the plurality of display devices 221, 222, 223, and 224 as illustrated in FIG. 2A, all of the plurality of display devices 221, 222, 223, and 224 should have different SSIDs. Also, in order for the external device 290 to transmit advertising content to each of the plurality of display devices 271, 272, 276, and 277 as illustrated in FIG. 2B, all of the plurality of display devices 271, 272, 276, and 277 should have different SSIDs.

However, when a plurality of display devices (e.g., 221, 222, 223, and 224) are products of the same model, SSIDs of the plurality of display devices 221, 222, 223, and 224 may have the same value.

A device and method for causing the plurality of display devices 221, 222, 223, and 224 having the same SSID to individually have unique SSIDs in a network will be described in greater detail below with reference to FIGS. 3 to 17.

Figure 3:
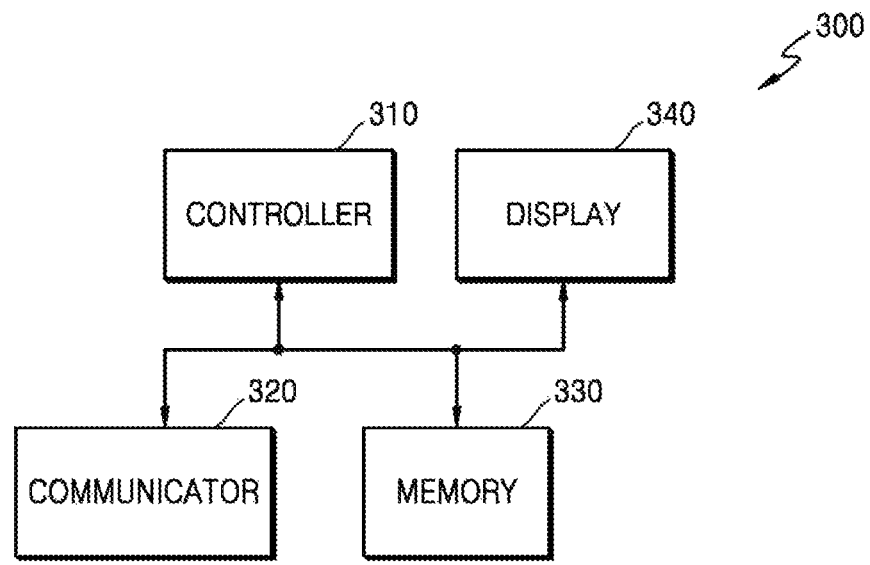
FIG. 3 is a block diagram illustrating an example display device.

FIG. 3 is a diagram illustrating an example display device.

A display device 300 according to the example embodiment is a display device able to communicate with at least one other display device connected to a network. For example, the network may correspond to the network 210 described with reference to FIG. 2A or the network 260 described with reference to FIG. 2B. For example, the network may denote a network which wirelessly connects the display device 300 according to the example embodiment and at least one other display device able to communicate with the display device 300. The display device 300 may be any one of the plurality of display devices 221, 222, 223, and 224 described with reference to FIG. 2A. Also, the display device 300 may be any one of the plurality of display devices 271, 272, 276, and 277 described with reference to FIG. 2B.

In other words, the network denotes a wireless network of a certain range which is formed so that a plurality of display devices including the display device 300 may wirelessly communicate. The plurality of display devices including the display device 300 are located in the network, and may communicate with an external device (e.g., 250) through the network.

Also, the network may be a short-range communication network or a mobile communication network. For example, the short-range communication network may be a network for short-range communication within a certain distance, and may include communication networks according to communication technology, such as WLAN, Wi-Fi, Bluetooth, Zigbee, Wi-Fi direct (WFD), ultra wideband (UWB), infrared data association (IrDA), Bluetooth low energy (BLE), near field communication (NFC), and so on. Also, the mobile communication network may include a communication network which enables transmission and reception of wireless signals to and from at least one of a base station, an external terminal, and a server over the mobile communication network.

An example in which the network 210 is the Wi-Fi network described with reference to FIG. 2A will be described below as an example. Also, the display device 300 will be described with reference to FIG. 2A using, as an example, a case in which the display device 300 is one of the plurality of display devices 221, 222, 223, and 224 (e.g., 221) and is able to communicate with at least one other display device (e.g., 222, 223, and 224) in the network 210.

Referring to FIG. 3, the display device 300 includes a controller (e.g., including processing circuitry) 310, a communicator (e.g., including communication circuitry) 320, a memory 330, and a display (e.g., including a display panel) 340.

The communicator 320 receives unique information used in identification of each of the at least one other display device connected to the network and an SSID from each of the at least one other display device. For example, the unique information is information used in identification of each of a plurality of display devices present in a network.

For convenience of description, unique information of the display device 300 will be referred to as its "self unique information," and an SSID of the display device 300 will be referred to as its "self SSID."

For example, the communicator 320 may include at least one of a short-range communication module (not shown), a wired communication module (not shown), and a mobile communication module (not shown) according to short-range communication technology. Each of these example modules and technologies are comprised of various example communication circuitry, some of which is described in greater detail below.

The short-range communication module (not shown) denotes a module for short-range communication within a certain range. Short-range communication technology according to an example embodiment of the present disclosure may, for example, be WLAN, Wi-Fi, Bluetooth, Zigbee, WFD, UWB, IrDA, BLE, NFC, etc., but is not limited thereto.

The wired communication module (not shown) denotes a module for communication using an electrical signal or an optical signal. Wired communication technology according to an example embodiment may include, for example, a pair cable, a coaxial cable, an optical fiber cable, an Ethernet cable, and so on.

The mobile communication module (not shown) transceives (e.g., transmit and receive) wireless signals with at least one of a base station, an external terminal, and a server over the mobile communication network. For example, the wireless signals may include various types of data based on transmission and reception of voice call signals, video call signal, or text/multimedia messages, or the like.

The memory 330 stores at least one of the at least one piece of unique information received by the communicator 320.

The memory 330 may include various forms of storage media. For example, the memory 330 may include at least one type of storage medium among a flash memory type memory, a hard disk type memory, a multimedia card micro type memory, a card type memory (a secure digital (SD) memory, an extreme digital (XD) memory, etc.), a random access memory (RAM), a static RAM (SRAM), a read-only memory (ROM), an electrically erasable programmable ROM (EEPROM), a programmable ROM (PROM), a magnetic memory, a magnetic disk, and an optical disk, or the like.

The memory 330 may store at least one piece of the unique information of the at least one other display device. For example, the memory 330 may store unique information of at least one other display device having the same SSID as the display device 300 among the other display devices connected to the network.

Also, the memory 330 may store all unique information received by the communicator 320.

The controller 310 may be configured to control an overall operation of the display device 300.

For example, the controller 310 may be configured to change self SSID based on a comparison between self unique information and the at least one piece of unique information stored in the memory 330 among pieces of the unique information received through the communicator 320. An SSID change operation of the controller 310 will be described in greater detail below with reference to FIGS. 6 to 12.

The display 340 displays a screen. The display 340 may be a screen output device including a display panel (not shown) which outputs a screen so that a user may visually recognize an image. For example, the display 340 may include an LFD which enables output of a large screen. Also, the display 340 may include a cathode ray tube (CRT) display, a liquid crystal display (LCD), a plasma display panel (PDP) display, an organic light-emitting diode (OLED) display, a field emission display (FED), a light-emitting diode (LED) display, a vacuum fluorescence display (VFD), a digital light processing (DLP) display, a flat panel display (FPD), a three-dimensional (3D) display, a transparent display, or so on.

Figure 4:
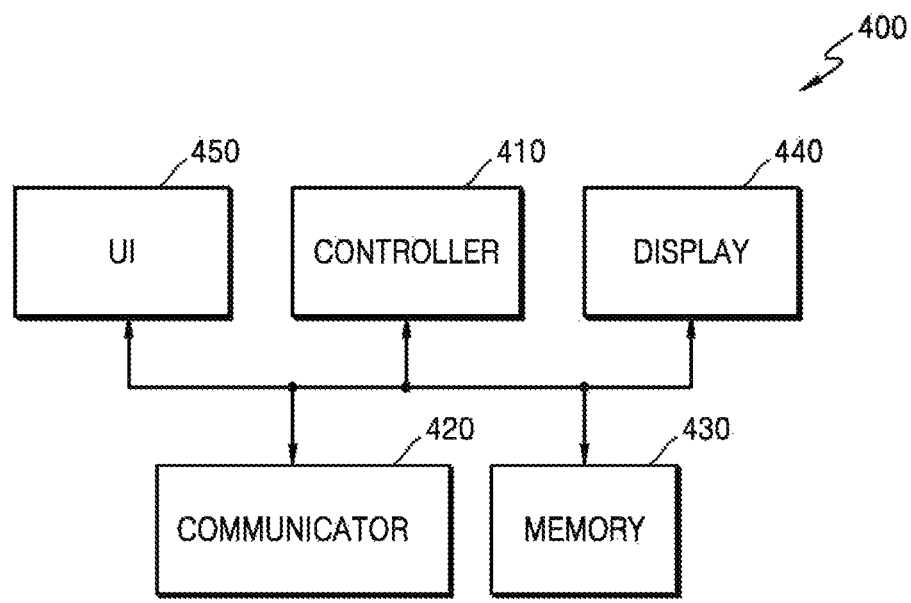
FIG. 4 is a block diagram illustrating another example display device.

FIG. 4 is another diagram illustrating another example display device. A controller (e.g., including processing circuitry) 410, a communicator (e.g., including communication circuitry) 420, a memory 430, and a display (e.g., including a display panel) 440 of a display device 400 illustrated in FIG. 4 may correspond, for example, to the controller 310, the communicator 320, the memory 330, and the display 340 of the display device 300 described with reference to FIG. 3, respectively. Therefore, descriptions of the display device 400 identical or similar to the descriptions of the display device 300 will be omitted. In this example embodiment, the display device 400 may further include a user interface (UI) 450 as compared to the display device 300.

The UI 450 is a device for receiving an instruction or data from the user. For example, when the user inputs an instruction or data through a remote control (not shown) which communicates with the display device 400, the UI 450 may receive the data output from the remote control (not shown). For example, when the remote control (not shown) communicates with the display device 400 through infrared communication, the UI 450 may include an infrared communication module (not shown) which may perform infrared communication or an optical receiver (not shown) which may receive infrared rays.

Also, the UI 450 may include a hardware device including a key pad, a mouse, a touch panel, a touch screen, and/or etc., thus receiving an instruction or data from the user through the included hardware device.

Figure 5A:
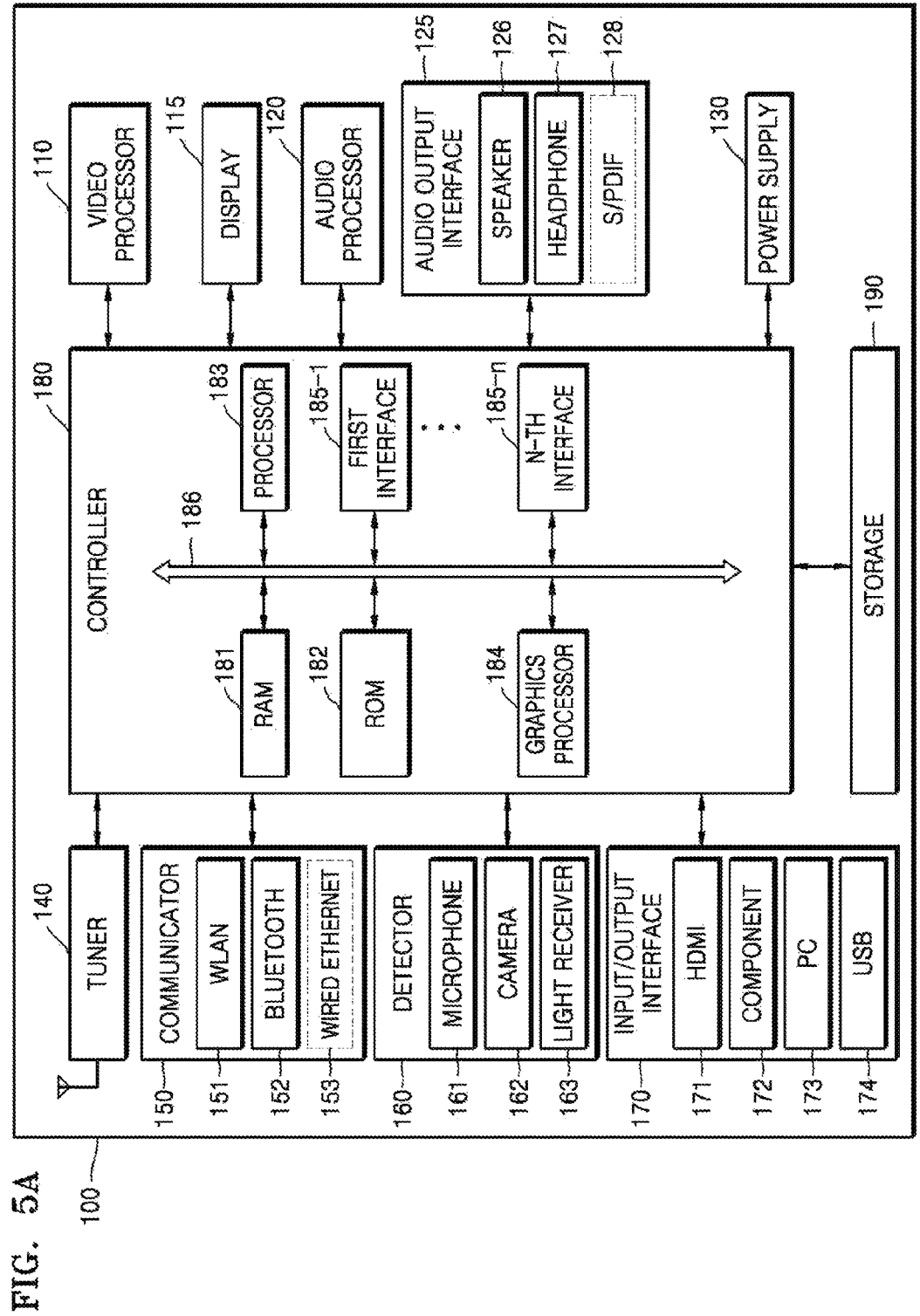
FIG. 5A is a block diagram illustrating an example configuration of a display device.

FIG. 5A is a block diagram illustrating an example configuration of an example display device.

A display device 100 illustrated in FIG. 5A includes a video processor 110, a display 115, an audio processor 120, an audio output interface 125, a power supply 130, a tuner 140, a communicator (e.g., including communication circuitry) 150, a detector (e.g., including various detection circuitry) 160, an input/output interface 170, a controller (e.g., including processing circuitry) 180, and a storage 190. For example, the controller 180, the communicator 150, the storage 190, and the display 115 may correspond to the controllers 310 and 410, the communicators 320 and 420, the memories 330 and 430, and the displays 340 and 440 of the display devices 300 and 400 described with reference to FIGS. 3 and 4, respectively. Also, a light receiver 163 included in the detector 160 may be included in the UI 450 described with reference to FIG. 4. Therefore, descriptions of the display device 100 identical or similar to the descriptions of FIGS. 3 and 4 will be omitted.

The video processor 110 processes video data received by the display device 100. The video processor 110 may perform various types of image processing, such as decoding, scaling, noise filtering, frame rate conversion, resolution conversion, etc., on the video data.

The display 115 displays a video included in a broadcast signal received through the tuner 140 on the screen under the control of the controller 180. Also, the display 115 may display content (e.g., a moving image) input through the communicator 150 or the input/output portion 170. For example, the display 115 may display content received from an external device (e.g., 250 of FIG. 2).

Also, the display 115 may output an image stored in the storage 190 under the control of the controller 180. Further, the display 115 may display a voice UI (e.g., including a voice command guide) for performing a voice recognition task corresponding to voice recognition, or a motion UI (e.g., including a user motion guide for motion recognition) for performing a motion recognition task corresponding to motion recognition.

The audio processor 120 processes audio data. The audio processor 120 may perform various types of processing, such as decoding, amplification, noise filtering, etc., on audio data. Meanwhile, the audio processor 120 may have a plurality of audio processing modules to process audio corresponding to a plurality of pieces of content.

The audio output interface 125 outputs audio included in the broadcast signal received through the tuner 140 under the control of the controller 180. The audio output interface 125 may output audio (e.g., voice and sound) input through the communicator 150 or the input/output portion 170. Also, the audio output interface 125 may output audio stored in the storage 190 under the control of the controller 180. The audio output interface 125 may include, for example at least one of a speaker 126, a headphone output terminal 127, and a Sony/Philips digital interface (S/PDIF) output terminal 128. The audio output interface 125 may include, for example, a combination of the speaker 126, the headphone output terminal 127, and the S/PDIF output terminal 128.

The power supply 130 supplies power input from an external power source to the components in the display device 100 under the control of the controller 180. Also, the power supply 130 may supply power output from one or more batteries (not shown) present in the display device 100 to the internal components 110 to 190 under the control of the controller 180.

Through amplification, mixing, resonance, etc. of a broadcast signal received in a wired or wireless manner, the tuner 140 may select a frequency of a channel that is intended to be received in the display device 100 from among many radio wave components and may be tuned to the selected frequency. The broadcast signal may include, for example, audio, a video, and additional information (e.g., an electronic program guide (EPG)).

Figure 5B:
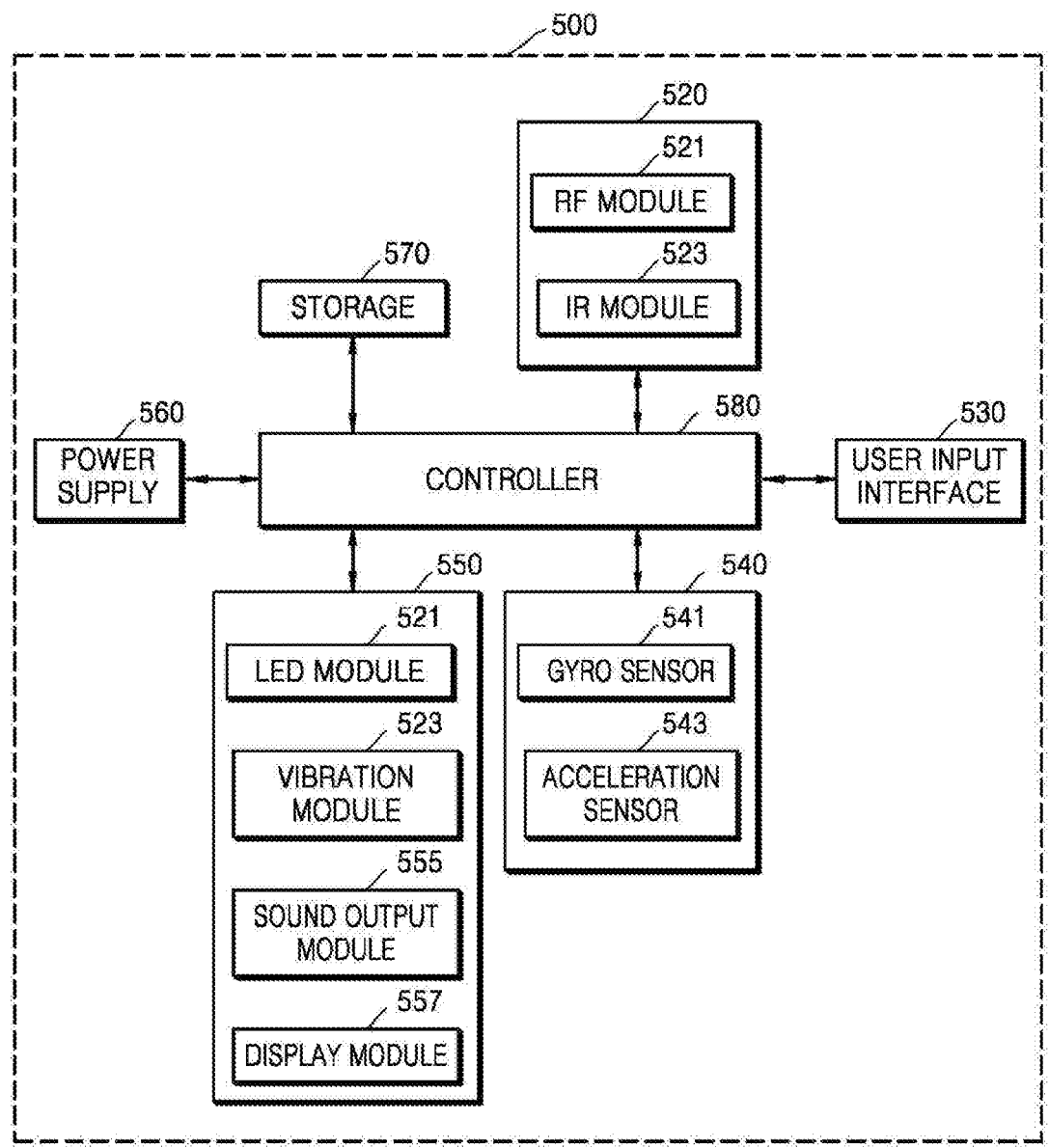
FIG. 5B is a block diagram illustrating an example control device for controlling the display device.

The tuner 140 may receive broadcast signals in a frequency band corresponding to a channel number (e.g., a cable broadcasting number "506") based on a user input (e.g., a control signal received from a control device 500 illustrated in FIG. 5B, such as an input of a channel number, a channel up-down input, and a channel input in an EPG screen).

The tuner 140 may receive broadcast signals from various sources, such as a terrestrial broadcast, a cable broadcast, a satellite broadcast, an Internet broadcast, and so on. The tuner 140 may also receive broadcast signals from a source, such as an analog broadcast, a digital broadcast, or so on. A broadcast signal received through the tuner 140 is decoded (e.g., audio decoding, video decoding, or additional information decoding) and split into audio, video, and/or additional information. The split audio, video, and/or additional information may be stored in the storage 190 under the control of the controller 180.

The tuner 140 of the display device 100 may be singular or plural in number. When the tuner 140 is plural in number according to an example embodiment, a plurality of broadcast signals may be output in a plurality of windows constituting a multi-window screen provided in the display 115.

The tuner 140 may be integrally implemented (i.e., all-in-one) with the display device 100, implemented as a separate device (e.g., a set-top box; not shown) having a tuner electrically connected to the display device 100, or implemented as a tuner (not shown) connected to the input/output portion 170.

The communicator 150 may connect the display device 100 to an external device (e.g., an audio device, etc.) under the control of the controller 180. The controller 180 may transceive content with the external device connected through the communicator 150, download an application from the external device, or perform web browsing. For example, the communicator 150 may access a network and receive content from an external device (e.g., 250 of FIG. 2).

As mentioned above, the communicator 150 may include at least one of a short-range communication module (not shown), a wired communication module (not shown), and a mobile communication module (not shown).

As an example, FIG. 5A illustrates an example in which the communicator 150 includes one of a WLAN module 151, a Bluetooth module 152, and a wired Ethernet module 153.

Alternatively, the communicator 150 may include a combination of the WLAN module 151, the Bluetooth module 152, and the wired Ethernet module 153. The communicator 150 may receive a control signal of a control device 500 under the control of the controller 180. The control signal may be implemented as a Bluetooth type, a radio frequency (RF) signal type, or a Wi-Fi type.

In addition to Bluetooth, the communicator 150 may further include modules for other short-range communication schemes (e.g., NFC (not shown) and BLE (not shown)).

In the example embodiment, the communicator 150 may receive unique information used in identification of each of at least one other display device connected to the network and an SSID from each of the at least one other display device. The received unique information and SSID may be stored in the storage 190.

The detector 160 detects a voice, an image, or an interaction of a user.

A microphone 161 receives, for example, an uttered voice of the user. The microphone 161 may convert the received voice into an electrical signal and output the electrical signal to the controller 180. The user's voice may include, for example, speech corresponding to a menu or a function of the display device 100. As the recognition range of the microphone 161, for example, about 4 m or less is recommended between the microphone 161 and the user's location, and the recognition range of the microphone 161 may vary based on the loudness of the user's voice and the surroundings (e.g., speaker sound and ambient noise).

The microphone 161 may be implemented integrally with or separately from the display device 100. The separated microphone 161 may be electrically connected to the display device 100 through the communicator 150 or the input/output portion 170.

Those of ordinary skill in the art will readily appreciate that the microphone 161 may be excluded based on performance and the structure of the display device 100.

A camera 162 receives images (e.g., consecutive frames) corresponding to a motion of the user including a gesture within the recognition range of a camera. For example, the recognition range of the camera 162 may be a distance of about 0.1 m to about 5 m from the camera 162 to the user. A user motion may include a motion, etc. of a part of the user's body, for example, a face, a facial expression, a hand, a fist, or a finger of the user. Under the control of the controller 180, the camera 162 may convert the received images into an electrical signal and output the electrical signal to the controller 180.

Using the recognition result of a received motion, the controller 180 may be configured to select a menu displayed in the display device 100 or to perform control corresponding to the motion recognition result. For example, the control corresponding to the motion recognition result may include channel adjustment, volume adjustment, and indicator movement.

In the example embodiment, the controller 180 may be configured to change an SSID based on a comparison between unique information of the display device 100 and at least one piece of unique information stored in the storage 190.

The camera 162 may include a lens (not shown) and an image sensor (not shown). Using a plurality of lenses and image processing, the camera 162 may support optical zoom or digital zoom. The recognition range of the camera 162 may be variously set based on an angle and surroundings of a camera. When the camera 162 includes a plurality of cameras, it is possible to receive a still 3D image or a 3D motion using the plurality of cameras.

The camera 162 may be implemented integrally with or separately from the display device 100. An additional device (not shown) including the separated camera 162 may be electrically connected to the display device 100 through the communicator 150 or the input/output portion 170.

Those of ordinary skill in the art will readily appreciate that the camera 162 may be excluded based on performance and the structure of the display device 100.

A light receiver 163 receives an optical signal (including a control signal) from the external control device 500 through a light-receiving window (not shown) in a bezel of the display 115 or so on. The light receiver 163 may receive an optical signal corresponding to a user input (e.g., a touch, a press, a touch gesture, a voice, or a motion) from the control device 500. From the received optical signal, a control signal may be extracted under the control of the controller 180.

For example, the light receiver 163 may receive a signal corresponding to a pointing position of the control device 500 and transmit the signal to the controller 180. For example, when a UI screen for receiving data or an instruction from the user is output through the display 115 and the user intends to input data or an instruction to the display device 100 through the control device 500 and the user moves the control device 500 while contacting a touch pad provided in the control device 500 with his or her finger, the light receiver 163 may receive a signal corresponding to the movement of the control device 500 and transmit the signal to the controller 180. Also, the light receiver 163 may receive a signal indicating that a particular button provided in the control device 500 has been pushed and transmit the signal to the controller 180. For example, when the user pushes the touch pad provided as a button type with his or her finger, the light receiver 163 may receive a signal indicating that the button-type touch pad has been pushed and transmit the signal to the controller 180. The signal indicating that the button-type touch pad has been pushed may be used as, for example, a signal for selecting one item.

The input/output interface 170 receives video (e.g., a moving image, etc.), audio (e.g., voice, music, etc.), additional information (e.g., an EPG, etc.), etc. from the outside of the display device 100 under the control of the controller 180. The input/output interface 170 may include, for example, a High-Definition Multimedia Interface (HDMI) port 171, a component jack 172, a PC port 173, and a Universal Serial Bus (USB) port 174. The input/output interface 170 may include a combination of the HDMI port 171, the component jack 172, the PC port 173, and the USB port 174.

Those of ordinary skill in the art will readily appreciate that the configuration and operation of the input/output interface 170 may be variously implemented according to example embodiments of the present disclosure.

The controller 180 is configured to control the overall operation of the display device 100 and signal flow between the internal components 110 to 190 of the display device 100, and to process data. When there is an input of the user or a condition which is set and stored in advance is satisfied, the controller 180 may be configured to execute an operating system (OS) and various applications stored in the storage 190.

The controller 180 may include, for example, a RAM 181 which stores a signal or data input from the outside of the display device 100 or is used as a storage area corresponding to various tasks performed in the display device 100, a ROM 182 for storing a control program for controlling the display device 100, and a processor (e.g., a CPU) 183.

The processor 183 may include a graphic processing unit (GPU; not shown) for graphics processing corresponding to a video. The processor 183 may be implemented as a system on chip (SoC) in which a core (not shown) and the GPU (not shown) are integrated. The processor 183 may include a single core, a dual-core, a triple-core, a quad-core, or a core which is a multiple thereof.

The processor 183 may include a plurality of processors. For example, the processor 183 may be implemented as a main processor (not shown) and a sub-processor (not shown) which operates in a sleep mode.

A graphics processor 184 generates a screen including a variety of objects, such as icons, images, text, etc., using a calculator (not shown) and a rendering portion (not shown). The calculator calculates attribute values, such as coordinate values, a shape, a size, a color, etc. with which each object will be displayed according to the layout of the screen, using a user interaction detected through the detector 160. The rendering portion generates screens of various layouts including objects based on attribute values calculated by the calculator. The screens generated by the rendering portion are displayed in the display region of the display 115.

FIG. 5B is a block diagram illustrating an example control device for controlling the display device.

The control device 500 is a device that transmits data or an instruction to the display device 100 when the data or the instruction for controlling the display device 100 which the user intends to input to the display device 100 is received.

Referring to FIG. 5B, the control device 500 may include a wireless communicator (e.g., including communication circuitry) 520, a user input interface 530, a sensor 540, an output interface 550, a power supply 560, a storage 570, and a controller (e.g., including processing circuitry) 580.

The wireless communicator 520 may transceiver (e.g., transmit and receive) signals with the display devices according to the example embodiments described above. The wireless communicator 520 may include an RF module 521 which may transceive signals with the display device 100 based on an RF communication standard. Also, the control device 500 may include an infrared (IR) module 523 which may transceive signals with the display device 100 based on an IR communication standard.

In this example embodiment, the control device 500 transmits a signal containing information on a motion, etc. of the control device 500 to the display device 100 through the RF module 521.

The control device 500 may receive a signal transmitted by the display device 100 through the RF module 521. Also, as occasion demands, the control device 500 may transmit an instruction for power on/off, channel change, volume change, etc. to the display device 100 through the IR module 523.

The user input portion 530 may, for example, be a keypad, buttons, a touch pad, a touch screen, or so on. The user may input an instruction related to the display device 100 to the control device 500 by manipulating the user input interface 530. When the user input interface 530 has a hard key button, the user may input an instruction related to the display device 100 to the control device 500 through an action of pushing the hard key button. When the user input interface 530 has a touch screen, the user may input an instruction related to the display device 100 to the control device 500 by touching a soft key of the touch screen.

Also, the user input interface 530 may have various types of input portions, such as a scroll wheel, a jog key, etc., which may be manipulated by the user.

Using the control device 500, the user may input an instruction or data to the display device 100.

Figure 6:
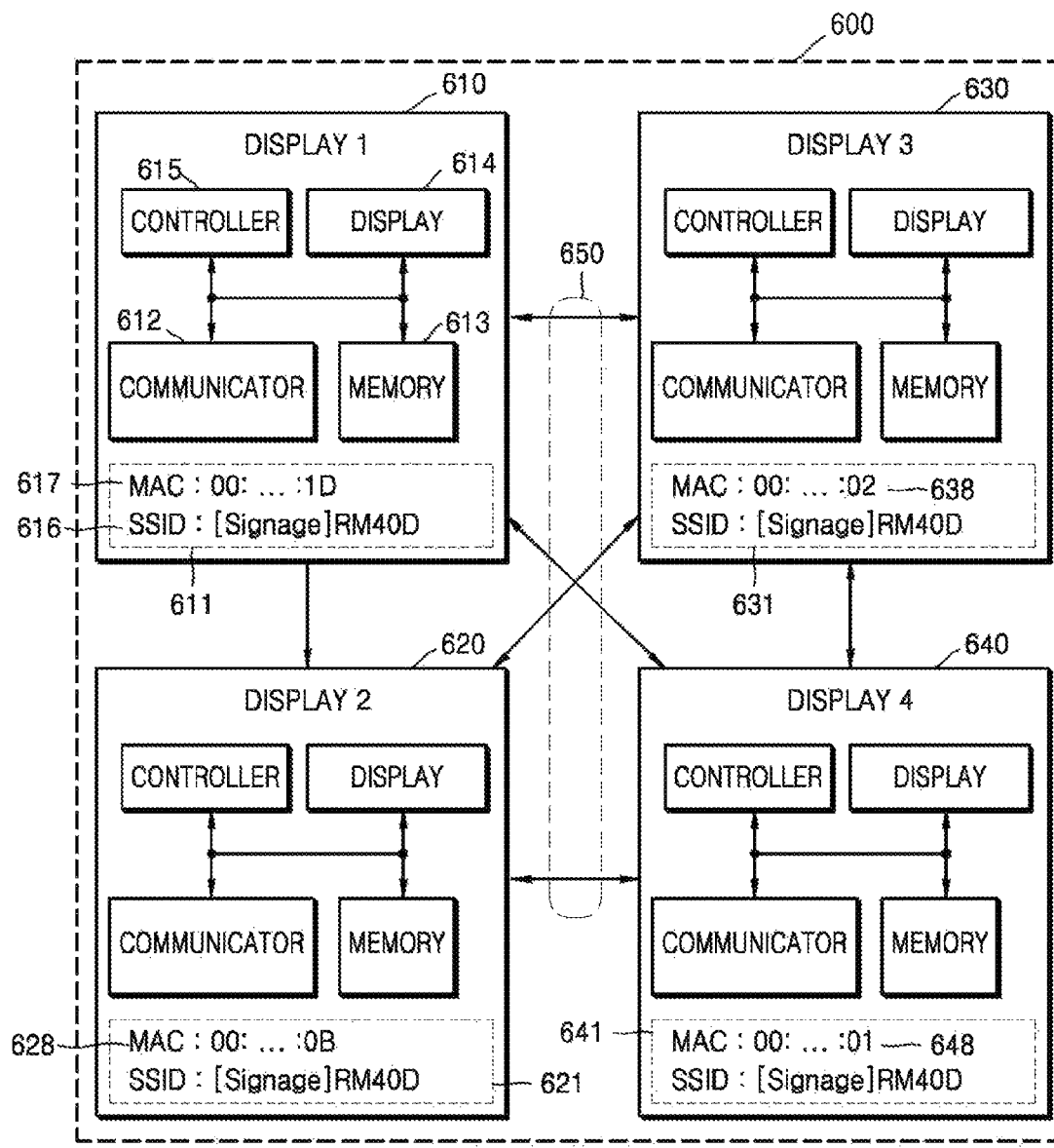
FIG. 6 is a diagram illustrating an example operation of display devices.

FIG. 6 is a diagram illustrating an example operation of the display device.

Figure 7:
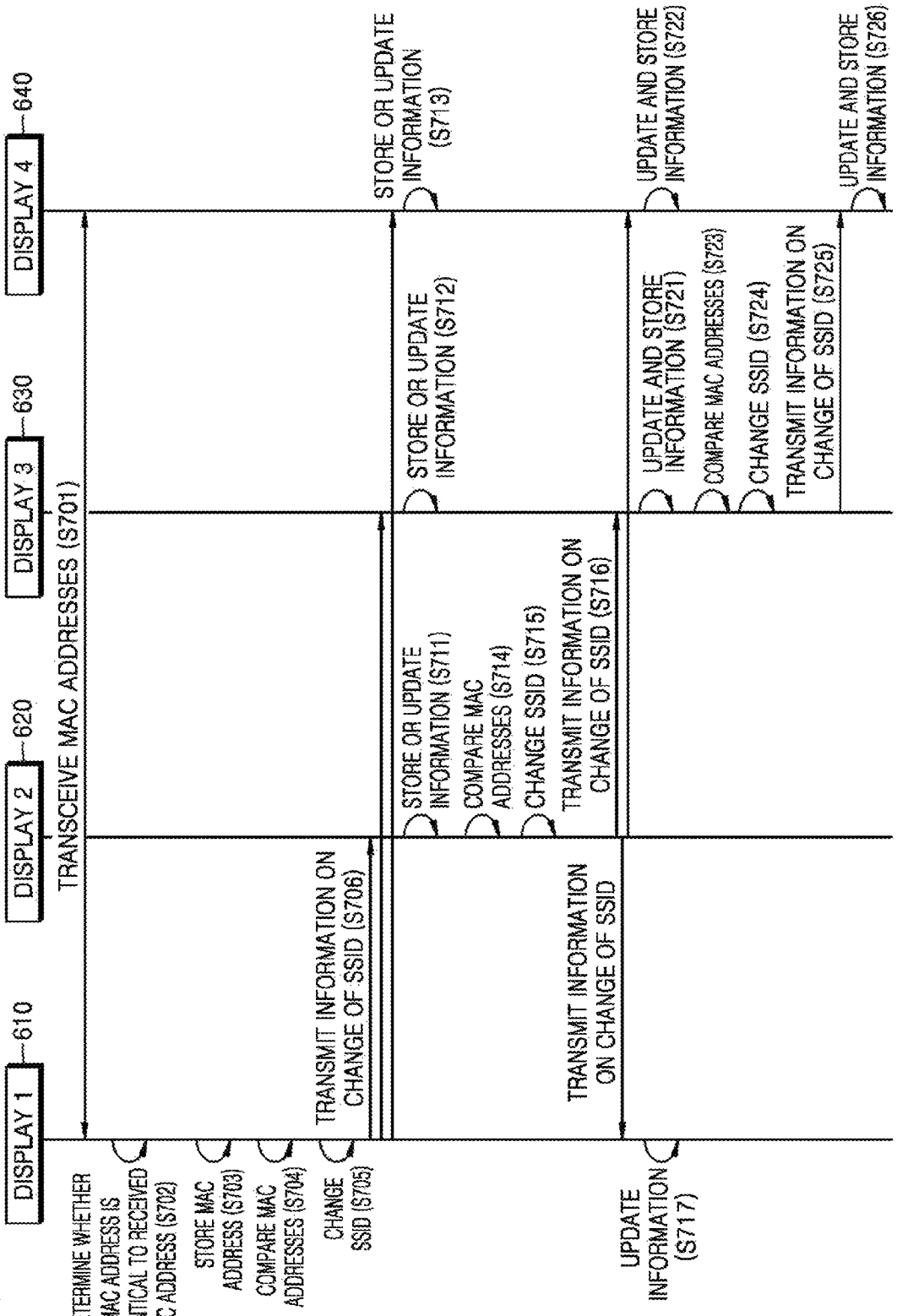
FIG. 7 is an operation diagram illustrating example operation of the display devices.

FIG. 7 is another diagram illustrating example operation of the display device.

The operation of a display device will be described in greater detail below with reference to FIGS. 6 and 7.

FIG. 6 illustrates a plurality of display devices 610, 620, 630, and 640 present in a network 600.

The display device 610 according to an example embodiment may, for example, correspond to the display devices 300, 400, and 100 described with reference to FIGS. 3, 4, and 5A. Also, the network 600 may correspond to the network 210 described with reference to FIG. 2A or the network 260 described with reference to FIG. 2B. Also, the plurality of display devices 610, 620, 630, and 640 present in the network 600 may correspond to the plurality of display devices 221, 222, 223, and 224 described with reference to FIG. 2A.

The network 600 may, for example, be a network to which a plurality of display devices having the same SSID are simultaneously connected for use.

For example, as illustrated in FIG. 2A, the network 600 may have a network range formed by one AP. Also, as illustrated in FIG. 2B, the network 600 may have a network range formed by a plurality of APs.

Also, the network 600 may be a wireless network connected to a plurality of display devices which are separately provided with a plurality of pieces of content from the same content provider (e.g., the external device 250 of FIG. 2A).

For example, when a plurality of display device of the same model are used in a certain space, the network 600 may be a wireless network to which the plurality of display devices of the same model are connected. For example, when a plurality of display devices of the same model separately receive content from an external device (e.g., 250 of FIG. 2A), as in the video wall 10 described with reference to FIG. 1, the network 600 may be a wireless network which connects the one external device 250 and the plurality of display devices included in the video wall 10.

In another example, a plurality of display devices of the same model which output advertising screens in a stand-alone manner may be used in an airport. In this example, the network 600 may be a wireless network formed to connect the plurality of display devices of the same model in the airport.

The display device 610 is able to communicate with at least one other display device 620, 630, and 640 present in the network 600. For example, the display device 610 and the at least one other display device 620, 630, and 640 may be connected to the network 600 and communicate with each other. In FIG. 6, an example in which the network 600 includes the three other display devices 620, 630, and 640 is illustrated as an example.

The display device 610 includes a controller 615, a communicator 612, a memory 613, and a display 614. For example, the controller 615, the communicator 612, the memory 613, and the display 614 of the display device 610 may correspond to the controller 310, the communicator 320, the memory 330, and the display 340 of the display device 300 shown in FIG. 3, respectively. An example in which the display device 610 includes the same components as the display device 300 illustrated in FIG. 3 is described as an example with reference to FIG. 6, but the display device 610 may include the same components as the display device 400 or 100 described with reference to FIG. 4 or 5A.

The communicator 612 of FIG. 6 receives unique information and an SSID of at least one other display device connected to a network. For example, the communicator 612 receives unique information and an SSID from each of the other display devices 620, 630, and 640 present in the network 600.

For example, unique information may be information used in identification of each of a plurality of display devices present in a network. For example, unique information may include a media access control (MAC) address of the display device 610. Since the display device 610 has a unique MAC address, it is possible to identify the particular display device 610 included in the plurality of display devices of the same model with the MAC address.

Also, unique information may, for example, be an Internet protocol (IP) address allocated for wireless communication in the network 600. Further, unique information may be a unique product number of a display device (e.g., 610), such as a serial number of the display device or so on. In this way, unique information may be information used in identification of each of the plurality of display devices present in the network 600.

An example in which the unique information is a MAC address will be described below as an example.

A MAC address typically consists of 48 bits represented in hexadecimal notation, and has values of six octet codes. For example, a MAC address may have six octet code values such as "18:67:80:00:00:1 D" or so on. In a MAC address, the 24 bits that are the first three octets represent a manufacturer code. The 24 bits that are the remaining three octets behind the manufacturer code represent a serial number given to a device. In a MAC address, the 24 bits that are the second set of three octets represent a serial number given to a device and have a unique value according to the device.

Referring to FIG. 7, the display device 610 receives a MAC address and an SSID from each of the display devices 620, 630, and 640 present in a network (S701).

For example, the communicator 612 may receive a MAC address and SSID 621 of the other display device 620 from the other display device 620, receive a MAC address and SSID 631 of the other display device 630 from the other display device 630, and receive a MAC address and SSID 641 of the other display device 640 from the other display device 640.

For example, the communicator 612 may include one or more of a short-range communication module (not shown), a wired communication module (not shown), and a mobile communication module (not shown), and may receive a MAC address and an SSID from each of the other display devices 620, 630, and 640 using the included communication module. For example, through a communication module conforming to a communication standard with which the network 600 is formed, the communicator 612 may receive the aforementioned MAC addresses and SSIDs. For example, when the network 600 is a Wi-Fi network, the communicator 612 may receive the aforementioned MAC addresses and SSIDs through the Wi-Fi communication module (not shown) provided therein.

Each of the plurality of display devices included in the network 600 may transmit its own MAC address and SSID to other display devices in a multicast manner. For example, the plurality of display devices may subscribe to a multicast service. Each of the plurality of display devices subscribing to the multicast service may notify other display devices that it is connected to the network, and may transmit its own MAC address and SSID to the other display devices. For example, the display device 610 may transmit its own MAC address and SSID to each of the other display devices 620, 630, and 640 through a multicast port 650.

Through the aforementioned multicast service, all of the plurality of display devices 610, 620, 630, and 640 may share information on MAC addresses and SSIDs of other display devices present in the network 600. For example, each of the plurality of display devices 610, 620, 630, and 640 connected to the network 600 may receive and store MAC addresses and SSIDs of other display devices.

In another example, the display device 610 may be connected to the network 600 first, the other display device 620 may be subsequently connected, then the other display device 630 may be subsequently connected, and finally the other display device 640 may be connected. In this example, when the other display device 620 is connected to the network 600, the other display device 620 notifies the display device 610 which has already been connected to the network 600 that it is connected, and transmits its own MAC address and SSID 621 to the display device 610. When the display device 610 is notified of the connection by the display device 620, the display device 610 may transmit its own MAC address and SSID 619 to the display device 620.

When the other display device 630 is subsequently connected to the network 600, the other display device 630 notifies the display devices 610 and 620 which have already been connected to the network 600 that it is connected, and transmits its own MAC address and SSID 631 to the display devices 610 and 620. When the display devices 610 and 620 are notified of the connection by the display device 630, the display devices 610 and 620 may transmit their own MAC addresses and SSIDs 619 and 621 to the display device 630.

When the other display device 640 is subsequently connected to the network 600, the other display device 640 notifies the display devices 610, 620, and 630 which have already been connected to the network 600 that it is connected, and transmits its own MAC address and SSID 641 to the display devices 610, 620, and 630. When the display devices 610, 620, and 630 are notified of the connection by the display device 640, the display devices 610, 620, and 630 may transmit their own MAC addresses and SSIDs 619, 621, and 631 to the display device 640.

The memory 613 stores at least one of at least one piece of unique information received through the communicator 612. In other words, the memory 613 may store some or all of the unique information of the respective other display devices 620, 630, and 640 (S703).

For example, the controller 615 may be configured to perform control so that unique information of at least one other display device whose SSID is identical to an SSID 616 of the display device 610 among the at least one other display device 620, 630, and 640 is stored in the memory 613. For example, the controller 615 may be configured to determine whether an SSID of at least one other display device is identical to the SSID 616 of the display device 610 (S702).

As an example, FIG. 6 illustrates a case in which all the display devices 610, 620, 630, and 640 connected to the network 600 have the same SSID. In this example, the controller 615 may be configured to perform control so that all unique information received through the communicator 612 is stored in the memory 613. In other words, the controller 615 may be configured to perform control so that unique information 628, 638, and 648 of the respective other display devices 620, 630, and 640 whose SSIDs are identical to the SSID 616 of the display device 610 is stored in the memory 613.

Accordingly, the memory 613 may store a MAC address 628 which is the MAC address of the other display device 620, a MAC address 638 which is the MAC address of the other display device 630, and a MAC address 648 which is the MAC address of the other display device 640.

Alternatively, the memory 613 may store unique information, for example, MAC addresses, of the respective other display devices 620, 630, and 640 connected to the network 600 regardless of whether or not SSIDs of the other display devices 620, 630, and 640 are the same as the SSID 616 of the display device 610.

The controller 615 may be configured to change an SSID based on a comparison between unique information 617 of the display device 610 and at least one piece of unique information stored in the memory 613.

For example, the controller 615 may be configured to compare the unique information 617 of the display device 610 and at least one piece of unique information stored in the memory 613 (S704). Then, the controller 615 may be configured to change or not change the SSID 616 of the display device 610 based on the comparison (S705).

In other words, when there is a display device whose SSID is identical to the SSID 616 of the display device 610 among the other display devices connected to the network 600, the controller 615 may or may not change the SSID 616 of the display device 610 so that the respective display devices connected to the network 600 may have different SSIDs from each other. An operation of the controller 615 changing the SSID 616 will be described in greater detail below with reference to FIGS. 8 to 11.

Figure 8:
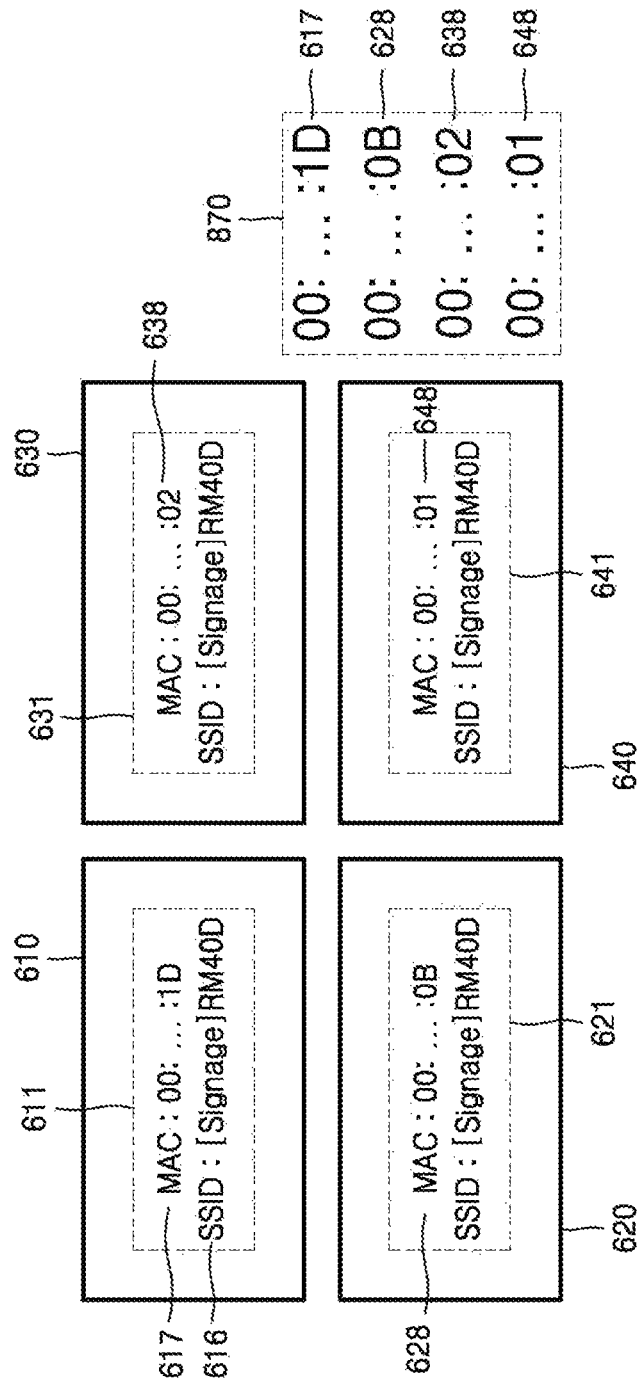
FIG. 8 is a diagram illustrating an example service set identifier (SSID) changing operation of the display device.

FIG. 8 is a diagram illustrating an example SSID changing operation of the display device. In FIGS. 8 to 11, components identical or similar to components in FIG. 6 are indicated by the same reference numerals.

Referring to FIG. 8, the memory 613 may store unique information, for example, MAC addresses, of the other display devices 620, 630, and 640 whose SSIDs are "[Signage]RM40D" which is identical to the SSID 616 of the display device 610. In other words, the memory 613 may store a table 870 including the MAC address 628 of the display device 620 whose SSID is identical to the SSID 616 of the display device 610, the MAC address 638 of the display device 630, and the MAC address 648 of the display device 640. Also, the memory 613 may include and store a MAC address 617 of the display device 610 in the table 870.

For example, when unique information is generated in certain-base notation, the controller 615 may be configured to change an SSID based on the value of the unique information in the certain-base notation. When the MAC address 617, which is the unique information, has a value of 8 bits*6=48 bits expressed in certain-base notation, for example, hexadecimal notation, the controller 615 may or may not change the SSID 616 based on the value of the MAC address 617.

For example, the controller 615 may compare the MAC addresses 628, 638, and 648 of the other display devices having SSIDs which are identical to the SSID 616 of the display device 610 with the MAC address 617 of the display device 610 based on the value of the last eight bits of their MAC addresses, and may determine whether to change an SSID based on the comparison.

For example, based on a result obtained by comparing "1D," which is the value of the last eight bits of the MAC address 617 of the display device 610, "0B," which is the value of the last eight bits of the MAC address 628 of the display device 620, "02," which is the value of the last eight bits of the MAC address 638 of the display device 630, and "01," which is the value of the last eight bits of the MAC address 648 of the display device 640, the controller 615 may or may not change the SSID 616 of the display device 610.

When the comparison result indicates that the MAC address 617 of the display device 610 has the largest value, the controller 615 may change the SSID 616. Alternatively, when the MAC address 617 of the display device 610 has the smallest value, the controller 615 may change the SSID 616.

For example, the controller 615 may align the table 870 stored in the memory 613 in ascending or descending order, and change the SSID 616 when the value of the MAC address 617 of the display device 610 is the largest or smallest value based on the aligned sequence. Also, the controller 615 may be configured to align the table 870 stored in the memory 613 in ascending or descending order, and may not change the SSID 616 when the value of the MAC address 617 of the display device 610 is not the largest or smallest value based on the aligned sequence.

For example, the controller 615 may be configured to compare "1D," which is the value of the last eight bits of the MAC address 617 of the display device 610, "0B," which is the value of the last eight bits of the MAC address 628 of the display device 620, "02," which is the value of the last eight bits of the MAC address 638 of the display device 630, and "01," which is the value of the last eight bits of the MAC address 648 of the display device 640, and may change the SSID 616 of the display device 610 when "1D," which is the value of the last eight bits of the MAC address 617 of the display device 610, is the largest value.

For example, the value "1D" corresponds to 29 in decimal notation, the value "0B" corresponds to 11 in decimal notation, the value "02" corresponds to 2 in decimal notation, and the value "01" corresponds to 1 in decimal notation. Therefore, when the MAC addresses of the display devices connected to the network 600 are aligned in order of value, the MAC address 617 of the corresponding display device 610 has the largest value, the MAC address 628 of the display device 620 has the second largest value, the MAC address 638 of the display device 630 has the third largest value, and the MAC address 648 of the display device 640 has the fourth largest value.

An example in which the controller 615 is configured to perform a comparison operation based on the value of the last eight bits of a MAC address, and to change the SSID of the display device 610 when the value of the last eight bits of the MAC address of the display device 610 is the largest value will be described below as an example.

Figure 9:
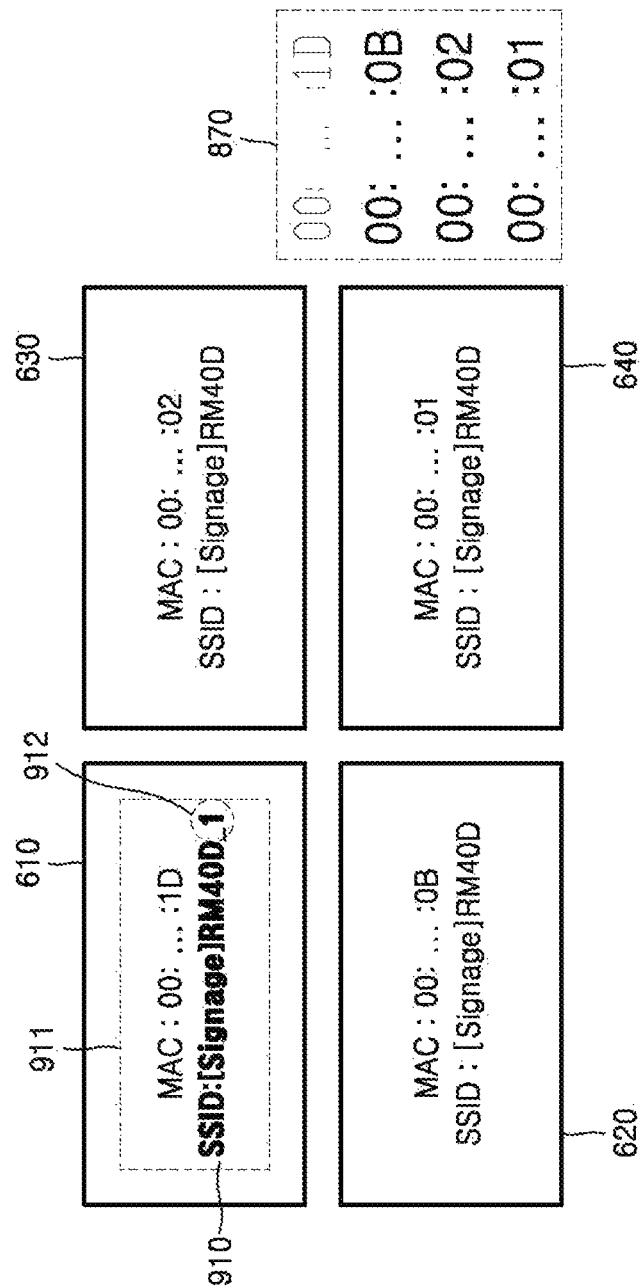
FIG. 9 is another diagram illustrating an SSID changing operation of the disclosed display device.

FIG. 9 is another diagram illustrating an example SSID changing operation of the display device.

Referring to FIG. 9, since the aforementioned comparison result indicates that the value of the last eight bits of the MAC address of the display device 610 is the largest value in the table 870, the controller 615 may be configured to change the SSID of the display device 610. For example, the controller 615 may add a number, such as "1," "2," "3," etc., or a letter, such as "a," "b," "c," etc., to the existing SSID to generate a changed SSID.

For example, the controller 615 may add an under bar "_" and a number to the existing SSID to generate a changed SSID.

Referring to a block 911, the controller 615 may add "_1" 912 to "[Signage]RM40D," which is the SSID of the display device 610 before the change, to change the SSID from "[Signage]RM40D" to "[Signage]RM40D_1" 910.

Referring back to FIG. 7, the display device 610 may notify each of the other display devices 620, 630, and 640 connected to the network 600 that its own SSID has been changed (S706). For example, the display device 610 may transmit change information indicating that its own SSID has been changed and the changed SSID to each of the other display devices 620, 630, and 640 connected to the network 600.

Each of the other display devices 620, 630, and 640 may receive the changed SSID, update the stored SSID information and MAC addresses with the changed SSID of the display device 610, and store the updated SSID information and MAC addresses (S711, S712, and S713). For example, when the changed SSID is received, each of the other display devices 620, 630, and 640 may delete the MAC address corresponding to the changed SSID, for example, the MAC address of the display device 610, from the table 870 stored in each of the other display devices 620, 630, and 640 because the changed SSID is not a duplicate SSID.

Subsequently, each of the other display devices 620, 630, and 640 may perform the SSID changing operation. A case in which the display devices 620, 630, and 640 perform SSID changing operations in that order will be described below as an example. Also, the other display devices 620, 630, and 640 receiving the changed SSID of the display device 610 may simultaneously perform the operation of changing their own SSIDs.

The SSID changing operations of the display devices 620, 630, and 640 will be described below using, as an example, a case in which unique information of a display device is a MAC address and the display device changes its own SSID when the value of the last eight bits of the MAC address is the largest value among the values of the last eight bits of MAC addresses of the display devices connected to the network 600.

An SSID changing operation of the display device 620 will be described in detail below with reference to FIG. 10.

Figure 10:
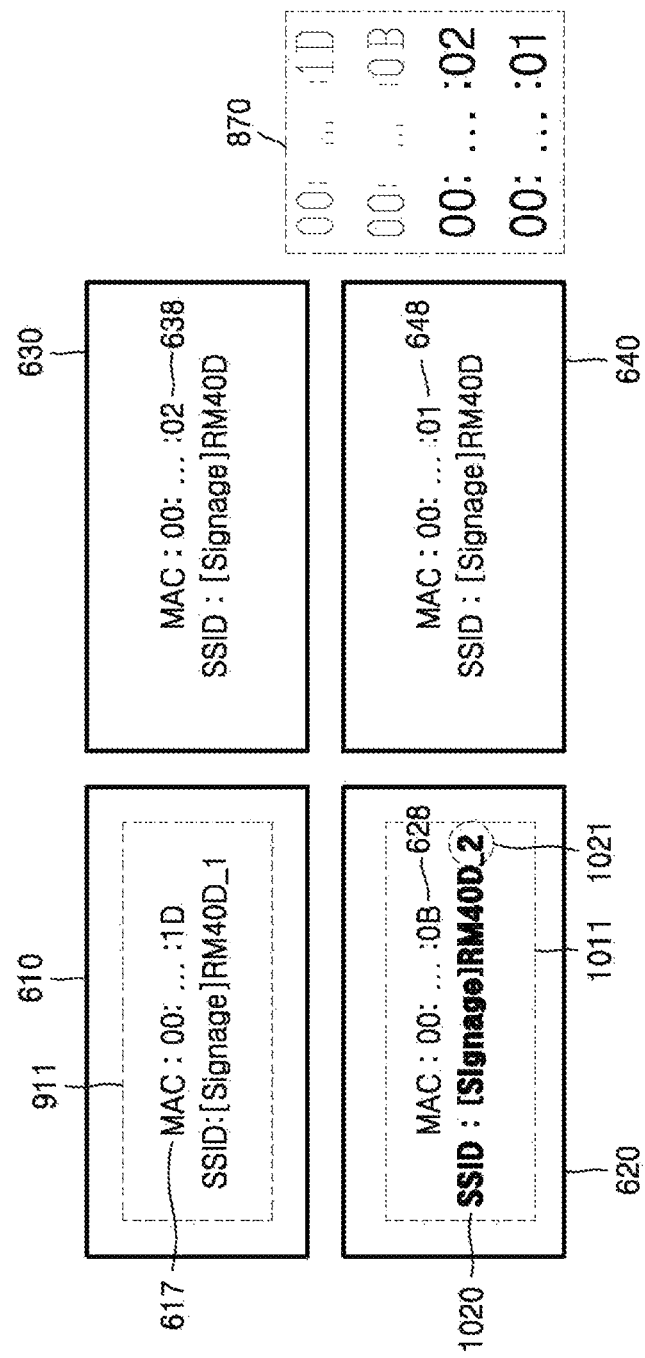
FIG. 10 is a diagram illustrating an example of another SSID changing operation of the display device.

FIG. 10 is another diagram illustrating an example SSID changing operation of the display device. The SSID changing operation of the display device 620 will be described in greater detail below with reference to FIGS. 6, 7, and 10.

The display device 620 includes the same internal components as the display device 610, and may perform the SSID changing operation in the same way as the display device 610.

Referring to FIGS. 7 and 10, the display device 620 may receive unique information and SSID information of each of the other display devices 610, 630, and 640 connected to the network 600 from the other display devices 610, 630, and 640 (S701).

The display device 620 may store unique information, for example, MAC addresses, of the other display devices 610, 630, and 640 whose SSIDs are identical to the SSID "[Signage]RM40D" of the display device 620.

Before the changed SSID "[Signage]RM40D_1" of the display device 610 is received, the display device 620 may determine whether to change its own SSID. For example, the display device 620 may compare stored MAC addresses, that is, its own MAC address 628 and the MAC addresses 617, 638, and 648 of the other display devices 610, 630, and 640 connected to the network 600, to determine whether its own MAC address 628 is the largest value. Here, the MAC addresses stored in the display device 620 may be the same as the MAC addresses in the table 870. Referring to the table 870, the MAC address 628 of the display device 620 does not correspond to the largest value, and thus the display device 620 does not change its own SSID.

When "[Signage]RM40D_1," which is the changed SSID of the display device 610, is received, the display device 620 may update information stored in the table 870 (S711). For example, the display device 620 may store MAC addresses of display devices having the same SSID as the display device 620. Since the SSID of the display device 610 has been changed to "[Signage]RM40D_1," display devices whose SSIDs are identical to the SSID of the display device 620 are the display devices 630 and 640. Therefore, the display device 620 compares its own MAC address 628 with the MAC address 638 of the display device 630 and the MAC address 648 of the display device 640 (S714). Since the comparison result indicates that the MAC address 628 of the display device 620 has the largest value, the display device 620 changes its own SSID (S715). For example, referring to a block 1011, the display device 620 may add "_2" 1021 to "[Signage]RM40D," which is its own SSID before the change, to change its own SSID from "[Signage]RM40D" to "[Signage]RM40D_2" 1020.

Subsequently, the display device 620 may transmit change information indicating that its own SSID has been changed and the changed SSID to each of the other display devices 610, 630, and 640 connected to the network 600 (S716).

Each of the other display devices 610, 630, and 640 may receive the changed SSID, update the stored SSID information and MAC addresses with the changed SSID of the display device 620, and store the updated SSID information and MAC address (S717, S721, and S722).

An SSID changing operation of the display device 630 will be described in greater detail below with reference to FIG. 11.

Figure 11:
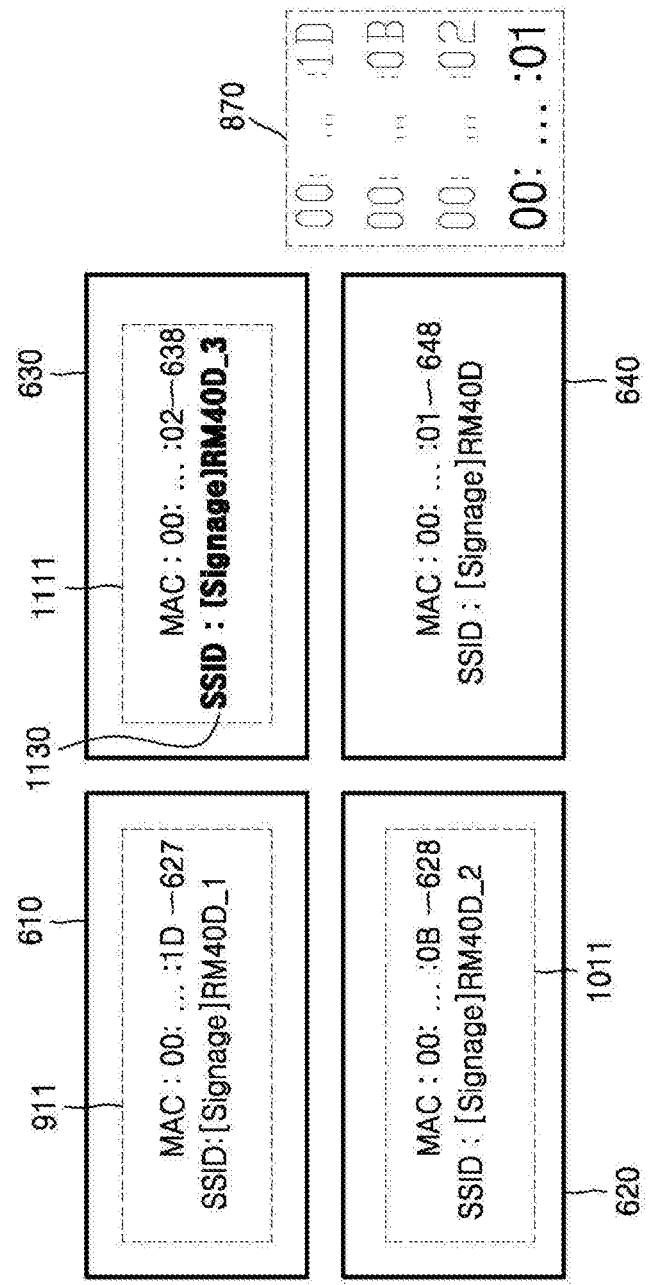
FIG. 11 is a diagram illustrating an example of another SSID changing operation of the display device.

FIG. 11 is another diagram illustrating an example SSID changing operation of the disclosed display device. The SSID changing operation of the display device 630 will be described in greater detail below with reference to FIGS. 6, 7, and 11.

The display device 630 includes the same internal components as the display device 610, and may perform the SSID changing operation in the same way as the display device 610.

Referring to FIGS. 7 and 11, the display device 630 may receive unique information and SSID information of each of the other display devices 610, 620, and 640 connected to the network 600 from the other display devices 610, 620, and 640 (S701).

The display device 630 may store unique information, for example, MAC addresses, of the other display devices 610, 620, and 640 whose SSIDs are identical to the SSID "[Signage]RM40D" of the display device 630.

Before the changed SSID "[Signage]RM40D_1" of the display device 610 and the changed SSID "[Signage]RM40D_2" of the display device 620 are received, the display device 630 may determine whether to change its own SSID. For example, the display device 630 may compare stored MAC addresses, that is, its own MAC address 638 and the MAC addresses 617, 628, and 648 of the other display devices 610, 620, and 640 connected to the network 600, to determine whether its own MAC address 638 is the largest value. Here, before the changed SSID "[Signage]RM40D_1" of the display device 610 and the changed SSID "[Signage]RM40D_2" of the display device 620 are received, the MAC addresses stored in the display device 630 may be the same as the MAC addresses in the table 870. The MAC address 638 of the display device 630 does not correspond to the largest value, and thus the display device 630 does not change its own SSID.

When "[Signage]RM40D_1," which is the changed SSID of the display device 610, and "[Signage]RM40D_2," which is the changed SSID of the display device 620, are received (S706 and S716), the display device 630 may update information stored in the table 870 (S721). For example, the display device 630 may store MAC addresses of display devices having the same SSID as the display device 630.

Since the SSID of the display device 610 has been changed to "[Signage]RM40D_1" and the SSID of the display device 620 has been changed to "[Signage]RM40D_2," only the display device 640 has the same SSID as the display device 630 in the network 600. Therefore, the display device 630 may delete the MAC address of the display device 610 and the MAC address of the display device 620 from the table 870 to store only the MAC address of the display device 630 and the MAC address of the display device 640.

Then, the display device 630 compares its own MAC address 638 with the MAC address 648 of the display device 640 (S723). Since the comparison indicates that the MAC address 638 of the display device 630 now has the largest value, the display device 630 changes its own SSID (S724). For example, referring to a block 1111, the display device 630 may add "_3" to "[Signage]RM40D," which is its own SSID before the change, to change its own SSID from "[Signage]RM40D" to "[Signage]RM40D_3" 1130.

Subsequently, the display device 630 may transmit change information indicating that its own SSID has been changed and the changed SSID to each of the other display devices 610, 620, and 640 connected to the network 600 (S725).

Each of the other display devices 610, 620, and 640 may receive the changed SSID of the display device 630, update the stored SSID information and MAC addresses with the changed SSID of the display device 630, and store the updated SSID information and MAC addresses (e.g., S726).

An SSID changing operation of the display device 640 will be described in greater detail below with reference to FIG. 12.

FIG. 12 is another diagram illustrating an example SSID changing operation of the display device. The display device 640 includes the same internal components as the display device 610, and may perform the SSID changing operation in the same way as the display device 610.

Referring to FIGS. 7 and 12, the display device 640 may receive unique information and SSID information of each of the other display devices 610, 620, and 630 connected to the network 600 from the other display devices 610, 620, and 630 (S701).

The display device 640 may store unique information, for example, MAC addresses, of the other display devices 610, 620, and 630 whose SSIDs are identical to the SSID "[Signage]RM40D" of the display device 640.

Even before the changed SSID "[Signage]RM40D_1" of the display device 610, the changed SSID "[Signage]RM40D_2" of the display device 620, and the changed SSID "[Signage]RM40D_3" of the display device 630 are received, the display device 640 may determine whether to change its own SSID.

For example, the display device 640 may compare stored MAC addresses, that is, its own MAC address 648 and the MAC addresses 617, 628, and 638 of the other display devices 610, 620, and 630 connected to the network 600, to determine whether its own MAC address 648 is the largest value. Here, before the changed SSID "[Signage]RM40D_1" of the display device 610, the changed SSID "[Signage]RM40D_2" of the display device 620, and the changed SSID "[Signage]RM40D_3" of the display device 630 are received, the MAC addresses stored in the display device 640 may be the same as the MAC addresses in the table 870. The MAC address 648 of the display device 640 does not correspond to the largest value, and thus the display device 640 does not change its own SSID.

When "[Signage]RM40D_1," which is the changed SSID of the display device 610, "[Signage]RM40D_2," which is the changed SSID of the display device 620, and "[Signage]RM40D_3," which is the changed SSID of the display device 630 are all received (S706, S716, and S725), the display device 640 may update information stored in the table 870 (S726).

For example, the display device 640 may store MAC addresses of display devices having the same SSID as the display device 640. Since the SSID of the display device 610 has been changed to "[Signage]RM40D_1," the SSID of the display device 620 has been changed to "[Signage]RM40D_2," and the SSID of the display device 630 has been changed to "[Signage]RM40D_3," there is no display device having the same SSID as the display device 640 in the network 600. Therefore, the display device 640 may not change its own SSID. In other words, when there is no display device having the same SSID as the display device 640 among the plurality of display devices connected to the network 600, the display device 640 may not perform the SSID changing operation.

The plurality of display devices 610, 620, 630, and 640 connected to the network 600 and having the same SSID perform SSID changing operations based on comparisons of unique information, thereby having different SSIDs as shown in FIG. 12.

When at least one of the at least one other display device is added or removed at a first point in time and the SSID of the display device 610 has been changed before the first point in time, the controller 615 of the display device 610 may be configured to not change the SSID of the display device 610. In other words, if the controller 615 of the display device 610 has already changed its own SSID (S705), the controller 615 may not change the SSID of the display device 610 even when changes occur thereafter in other display devices connected to the network 600 and the problem of duplication of an SSID additionally occurs. In other words, a display device having a history of change may prioritize the history of change and may not change its own SSID again.

Also, the controller 615 of the display device 610 may be configured to update the SSID based on the comparison at certain time intervals. For example, the controller 615 of the display device 610 may be configured to re-perform the above-described SSID changing operation based on a comparison of unique information at certain time intervals. Accordingly, the controller 615 of the display device 610 may be configured to cause the SSID to be updated at the certain time intervals.

As described above, in the example embodiment, when a plurality of display devices are connected to a network, each of the display devices may solve the problem of duplication of an SSID between the plurality of display devices through a comparison operation between unique information. For example, without using an additional server or external device for solving the problem of duplication of an SSID, the respective display devices may readily and rapidly change their SSIDs which are identical to SSIDs of other display devices. Accordingly, it is possible to overcome problems which may occur due to duplication of an SSID between a plurality of display devices connected to a network, for example, problems which may occur when the external device 250 transmits content.

Also, when a user sets an SSID, the display device 610 may store information on a history of user setting. When there is the user setting, the display device 610 may maintain the SSID set by the user without performing the above-described SSID changing operation based on a comparison of unique information. For example, in the case of a display device whose SSID has been set by the user among the plurality of display devices connected to the network 600, the user may change SSIDs of other display devices which have not been set by the user, so that duplication of an SSID is removed from the network 600.

Example embodiments of a UI screen which may be output by the disclosed display device will be described below with reference to FIGS. 13A to 16D. Also, example embodiments of the UI screen which may be output by the disclosed display device will be described in greater detail below with reference to the display device 400 illustrated in FIG. 4.

Figure 13A:
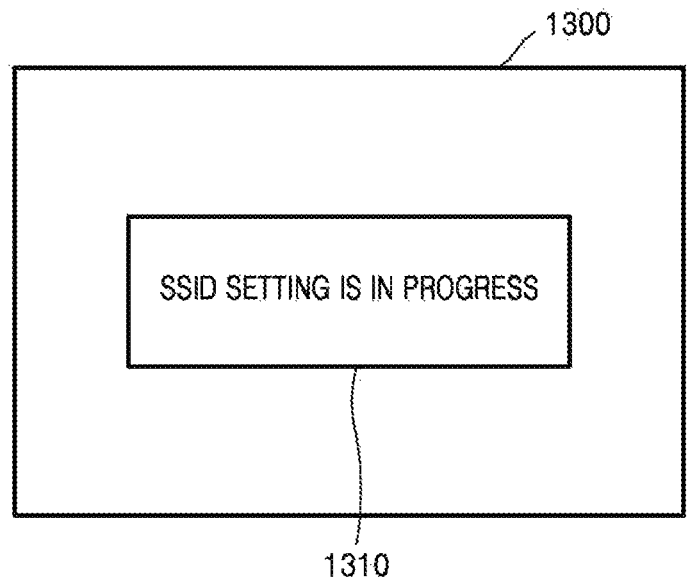
FIG. 13A is a diagram illustrating an example of a user interface (UI) screen output by the display device.

FIG. 13A is a diagram illustrating an example of a UI screen output by the display device.

Referring to FIG. 13A, when the controller 410 is performing an SSID changing or setting operation, the display device 400 may output a UI screen 1300 indicating a changing or setting of an SSID.

For example, the display 440 may display the UI screen 1300 including a message 1310 which provides a notification of setting of an SSID.

FIG. 13A illustrates the example of a case in which the message 1310 is output at the center of the UI screen 1300, but the message 1310 may be output as a pop-up notification message on one side or at a corner of the UI screen 1300.

In addition, the message 1310 may have various other shapes and sizes, and may be output at various positions in the UI screen 1300.

Figure 13B:
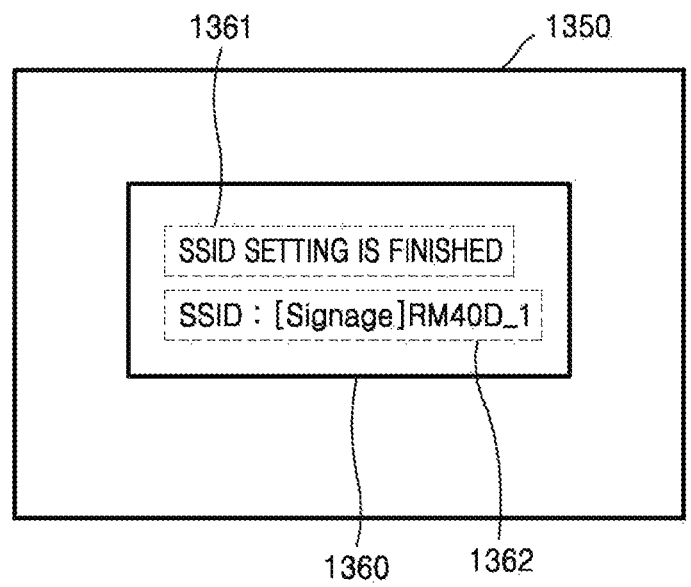
FIG. 13B is a diagram illustrating another example of a UI screen output by the display device.

FIG. 13B is a diagram illustrating another example of a UI screen output by the display device.

Referring to FIG. 13B, when the controller 410 finishes the SSID setting operation, the display device 400 may output a UI screen 1350 indicating that setting of an SSID has been finished.

For example, the display 440 may display the UI screen 1350 including at least one of a message 1361 indicating that setting of an SSID is finished and information 1362 indicating a changed SSID.

FIG. 13B shows the example of a case in which a message 1360 is output at the center of the UI screen 1350, but the message 1360 may be output as a pop-up notification message on one side or at a corner of the UI screen 1350.

Figure 14A:
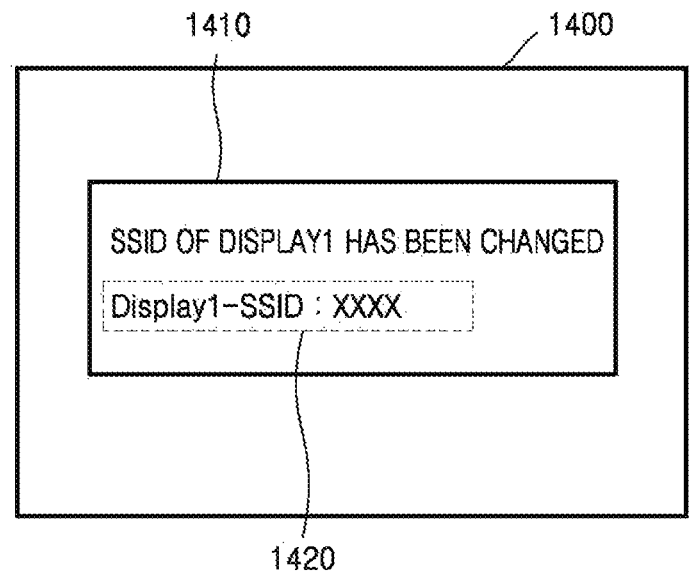
FIG. 14A is a diagram illustrating another example of a UI screen output by the display device.

FIG. 14A is a diagram illustrating another example of a UI screen output by the display device.

When an SSID is changed in any one (e.g., 610) of the plurality of display devices connected to the network 600, the display device 610 in which the SSID has been changed may transmit information indicating that the SSID of the display device 610 has been changed to at least one of the other display devices 620, 630, and 640 connected to the network 600.

Referring to FIG. 14A, when an SSID is changed in any one (e.g., 610) of the plurality of display devices connected to the network 600, each of the other display devices 620, 630, and 640 may output a UI screen 1400 including information 1410 indicating that the SSID of the display device 610 has been changed.

For example, the UI screen 1400 may include information 1420 including the changed SSID of the display device 610.

Accordingly, it is possible to enable a user of the other display devices whose SSIDs have not been changed to readily recognize the display device whose SSID has been changed and the changed SSID.

Figure 14B:
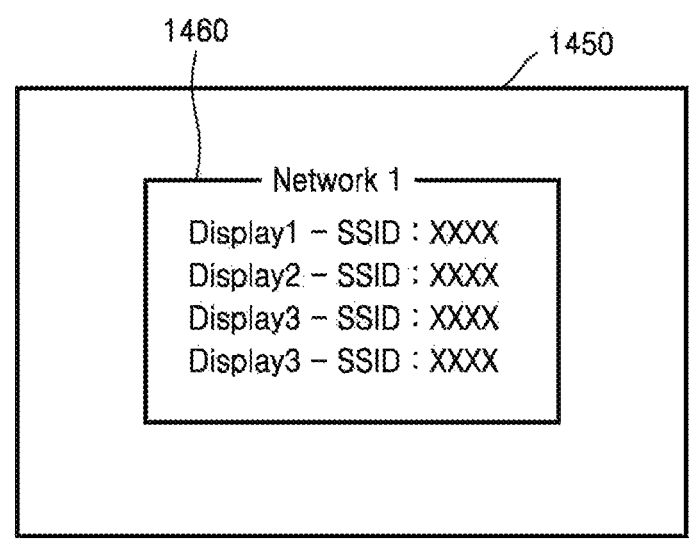
FIG. 14B is a diagram illustrating another example of a UI screen output by the display device.

FIG. 14B is a diagram illustrating another example of a UI screen output by the display device.

Referring to FIG. 14B, each of the plurality of display devices connected to the network 600 may periodically update its own SSID information and output a UI screen 1450 including updated SSID information 1460. Alternatively, when at least one display device connected to the network 600 changes SSID information, each of the plurality of display devices connected to the network 600 may output the UI screen 1450 including the SSID information 1460 updated with the changed information.

Figure 15A:
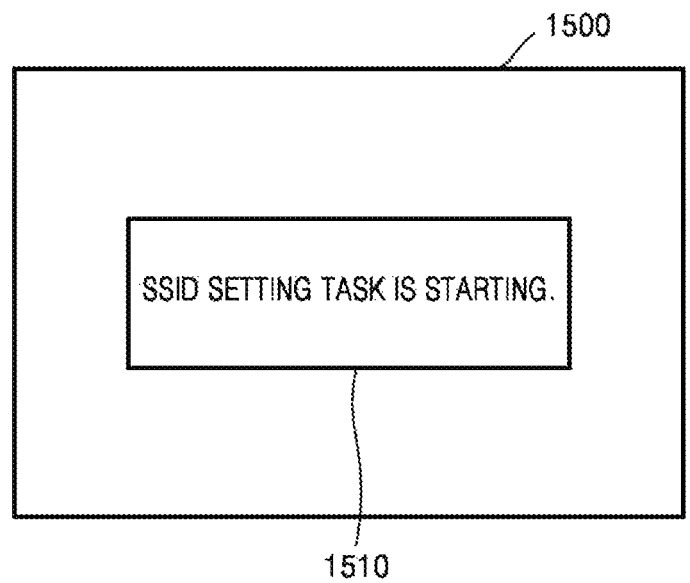
FIG. 15A is a diagram illustrating another example of a UI screen output by the display device.

FIG. 15A is a diagram illustrating another example of a UI screen output by the display device.

Referring to FIG. 15A, at least one of the plurality of display devices 610, 620, 630, and 640 connected to the network 600 may output a UI screen 1500 indicating a setting of its own SSID. For example, a UI screen for indicating the start of an SSID setting task may be output.

Figure 15B:
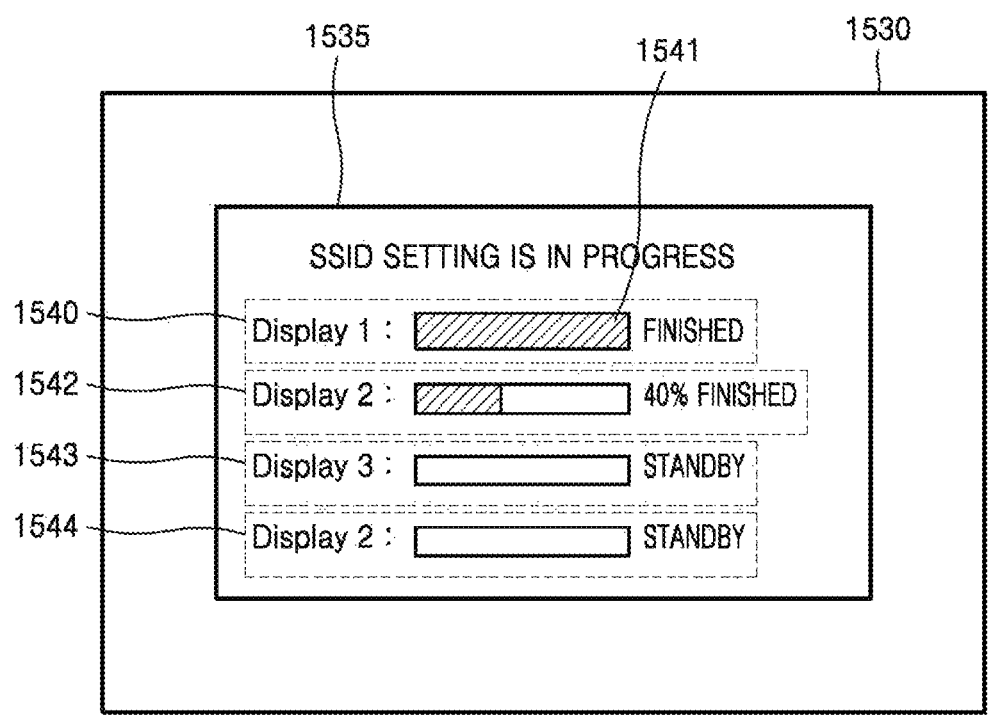
FIG. 15B is a diagram illustrating another example of a UI screen output by the display device.

FIG. 15B is a diagram illustrating another example of a UI screen output by the display device.

Referring to FIG. 15B, at least one of the plurality of display devices 610, 620, 630, and 640 connected to the network 600 may output a UI screen 1530 including information 1535 indicating the degrees of progress of SSID setting operations of the plurality of display devices 610, 620, 630, and 640 connected to the network 600. For example, it is assumed that the SSID of the display device 610 has been changed to "[Signage]RM40D_1" and an SSID changing operation of the display device 620 is underway. Then, at least one of the plurality of display devices 610, 620, 630, and 640 may provide a notification that the SSID of the display device 610 has been changed as illustrated in a block 1540 using a progress bar 1541 representing the degree of progress of a changing operation. As illustrated in a block 1542, the at least one display device may also provide a notification that an operation of changing the SSID of the display device 620 is underway. Further, as illustrated in blocks 1543 and 1544, the at least one display device may provide a notification that operations of changing the SSIDs of the display devices 630 and 640 have not started yet.

Through the UI screen 1530, the user may see the degrees of progress of SSID setting operations of the plurality of display devices 610, 620, 630, and 640 connected to the network 600 at a glance.

Figure 15C:
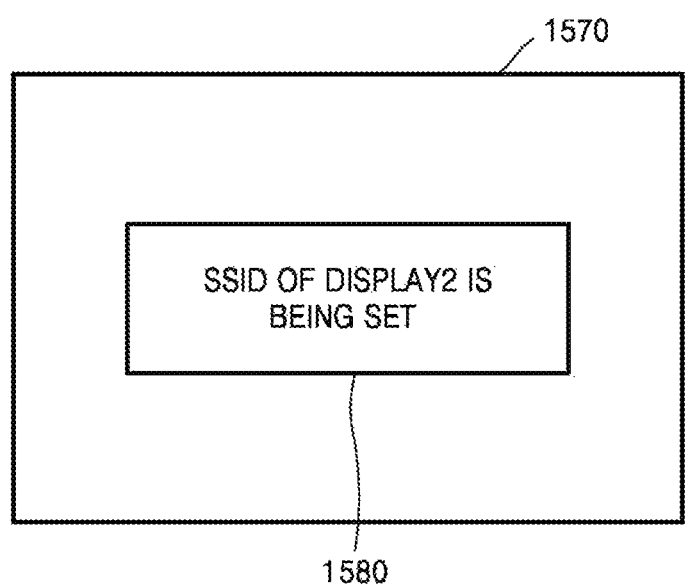
FIG. 15C is a diagram illustrating another example of a UI screen output by the display device.

FIG. 15C is a diagram illustrating another example of a UI screen output by the display device.

Referring to FIG. 15C, while any one (e.g., 620) of the plurality of display devices 610, 620, 630, and 640 connected to the network 600 is performing an SSID changing operation, at least one of the plurality of display devices 610, 620, 630, and 640 may output a UI screen 1570 including information 1580 indicating that the SSID is being changed in the display device 620.

Referring back to FIG. 6, when the display device 610 is added to the network 600 at a first point in time t1, the controller 615 may be configured to determine whether there is at least one another display device whose SSID has not been changed at a second point in time t2 before the first point in time t1 among the at least one other display device connected to the network 600. Based on a comparison between unique information of the at least one other display device determined to have an SSID which has not been changed and the unique information of the display device 610, the controller 615 may change the SSID of the display device 610.

In other words, when the other display devices 620, 630, and 640, which have been connected to the network 600 before the display device 610 is connected to the network 600, have already performed SSID changing operations, the controller 615 of the display device 610 may be configured to not perform a comparison operation with the unique information of the other display devices 620, 630, and 640 which have histories of change. Accordingly, the SSIDs of the display devices having the histories of change are not changed again, so that the histories of change may be prioritized.

Figure 16A:
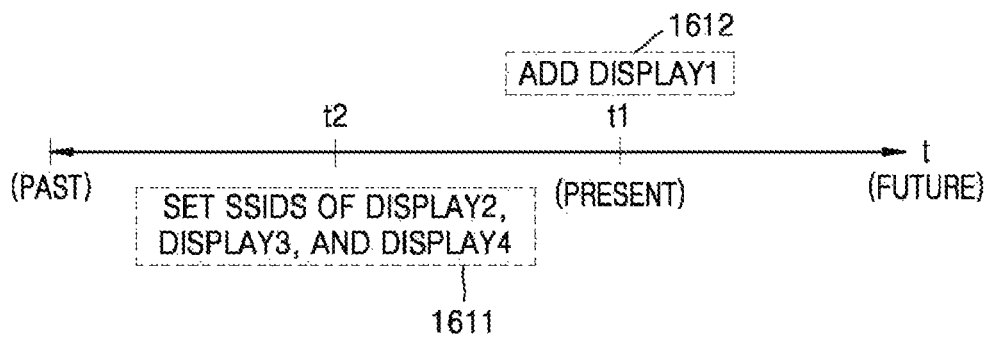
FIG. 16A is a time chart illustrating an example of addition of a plurality of display devices connected to a network.

FIG. 16A is a time chart illustrating an addition of a plurality of display devices connected to a network.

Referring to FIG. 16A, an SSID of each of the display device (DISPLAY2) 620, the display device (DISPLAY3) 630, and the display device (DISPLAY4) 640 has been changed at the second point in time t2 before the first point in time t1, which is the current time, and the display device (DISPLAY1) 610 is added 1612 at the first point in time t1 following the second point in time t2.

Then, the controller 615 of the display device 610 may be configured to determine whether there is a display device whose SSID has not been changed before the first point in time t1, and to perform the above-described comparison operation of unique information only when there is a display device having no history of change. When there are no display devices whose SSID has been changed before the first point in time t1 as illustrated in FIG. 16A, the display device 610 does not change its own SSID through the comparison operation of unique information.

For example, it is assumed that, when the SSIDs of the display devices 620, 630, and 640 are respectively "[Signage]RM40D_1," "[Signage]RM40D_2," and "[Signage]RM40D" at the first point in time t1, the display device 610 having the SSID "[Signage]RM40D" is added 1612 at the first point in time t1.

In this example, although there is the display device 640 having the same SSID as the display device 610, the display device 610 may not perform the comparison operation of unique information. For example, the display device 610 may not change its own SSID based on the above-described comparison operation of unique information, but may reset the unique information based, for example, on a user setting. Alternatively, regardless of a comparison result between unique information, the display device 610 may cause the SSID of the display device 610 which has not been changed to be changed first. In other words, the display device 610 may change the SSID of the display device 610, which has not been changed, to "[Signage]RM40D_3."

Figure 16B:
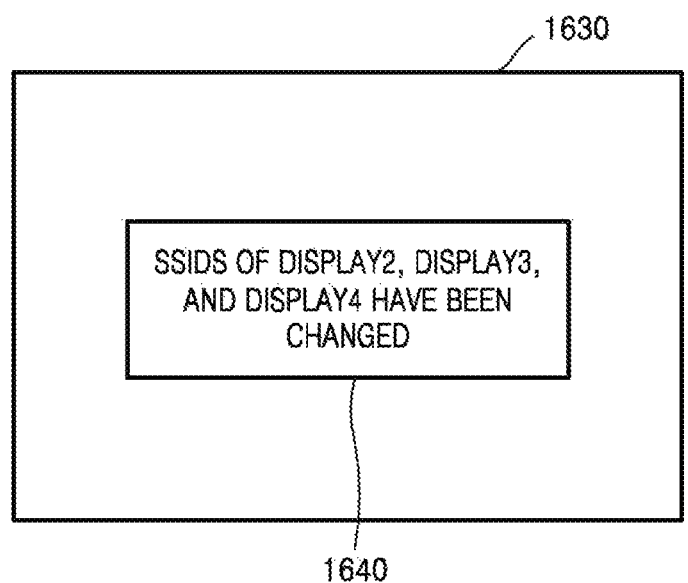
FIG. 16B is a diagram illustrating another example of a UI screen output by the display device.

FIG. 16B is a diagram illustrating another example of a UI screen output by the display device.

As described above, when the other display devices 620, 630, and 640 connected to the network 600 before the display device 610 is connected to the network 600, have already performed SSID changing operations, the controller 615 of the display device 610 may be configured to perform control so that a UI screen related to a change of the SSID may be output through the display 614.

Referring to FIG. 16B, when the other display devices 620, 630, and 640 connected to the network 600 before the display device 610 is connected to the network 600, have already performed SSID changing operations as described above with reference to FIG. 16A, the controller 615 of the display device 610 may output a UI screen 1630 including information 1640 indicating the histories of change. For example, the UI screen 1630 may include information 1640 indicating that the SSID of each of the other display devices DISPLAY2, DISPLAY3, and DISPLAY4 has been changed before the first point in time t1.

Figure 16C:
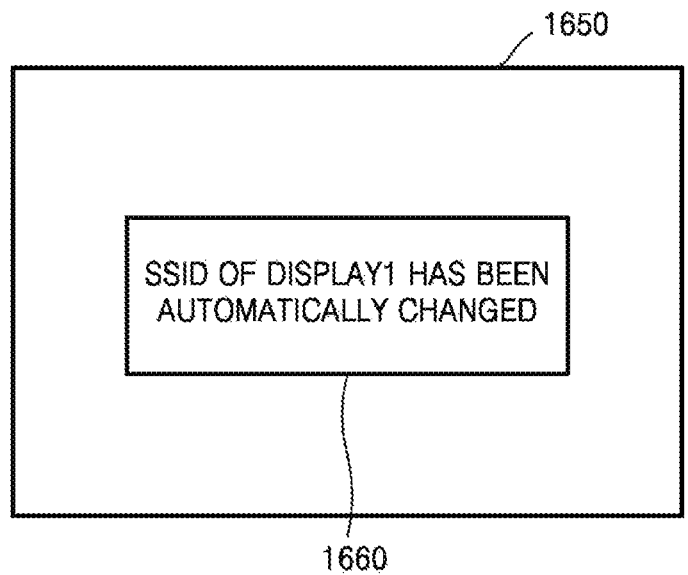
FIG. 16C is a diagram illustrating another example of a UI screen output by the disclosed display device.

FIG. 16C is a diagram illustrating another example of a UI screen output by the display device.

Referring to FIG. 16C, when the other display devices 620, 630, and 640 connected to the network 600 before the display device 610 is connected to the network 600, have already performed SSID changing operations as described above with reference to FIG. 16A, the controller 615 of the display device 610 may not make a change of the SSID based on the above-described comparison operation of unique information. For example, regardless of a comparison result between unique information, the controller 615 may be configured to cause the SSID of the display device 610 which has not been changed to be changed first. In other words, the display device 610 may automatically change the SSID of the display device 610, which has not been changed, to "[Signage]RM40D_3." Accordingly, the controller 615 may be configured to perform control so that a UI screen 1650 including information 1660 indicating that the SSID of the display device 610 having no history of change has been automatically changed first is output.

Figure 16D:
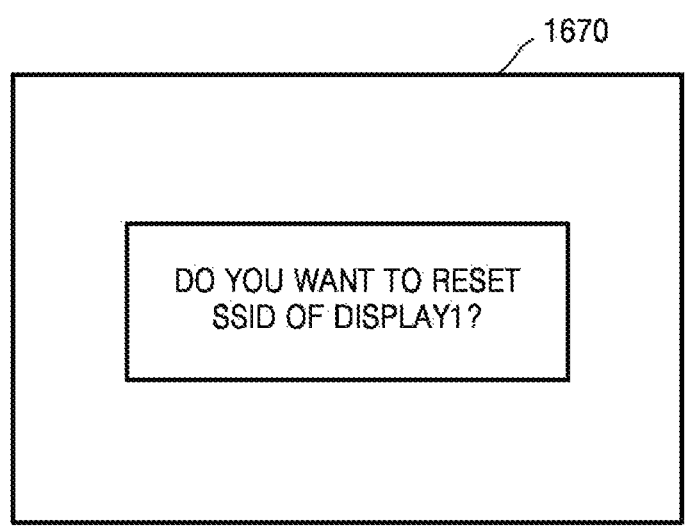
FIG. 16D is a diagram illustrating another example of a UI screen output by the display device.

FIG. 16D is a diagram illustrating another example of a UI screen output by the disclosed display device.

Referring to FIG. 16D, when the other display devices 620, 630, and 640 connected to the network 600 before the display device 610 is connected to the network 600, have already performed SSID changing operations as described above with reference to FIG. 16A, the display device 610 may output a UI screen 1670 for resetting its own SSID.

For example, when the other display devices 620, 630, and 640 connected to the network 600 before the display device 610 is connected to the network 600, have already performed SSID changing operations as described above with reference to FIG. 16A, the display device 610 may not perform an SSID changing operation based on the above-described comparison operation of unique information, but may change its own SSID based on a user setting. Using the control device 500 described with reference to FIG. 5B, the user may input an SSID for a change.

Referring back to FIG. 6, when at least one of the at least one other display device 620, 630, and 640 is added or removed at a first point in time and the SSID has been changed before the first point in time, the controller 615 of the display device 610 may be configured to not change the SSID. In other words, when the SSID of the display device 610 has been changed before the current point in time, even though a display device which connects to the network 600 is changed after the current point in time and causes the problem of duplication of an SSID again, the controller 615 of the display device 610 may be configured to not change the SSID.

Also, at certain time intervals, the controller 615 of the display device 610 may be configured to re-perform the above-described comparison operation of unique information to update the SSID. For example, as described above with reference to FIGS. 16A to 16D, although the SSID is not currently changed, an SSID changing operation may be performed again after a certain time, for example, one month or so on.

Further, when another display device is added to the network 600 or at least one of the at least one other display device connected to the network 600 leaves the network 600, the controller 615 of the display device 610 may be configured to perform control so that a UI screen indicating the addition or the departure is displayed on the display 614.

Figure 17:
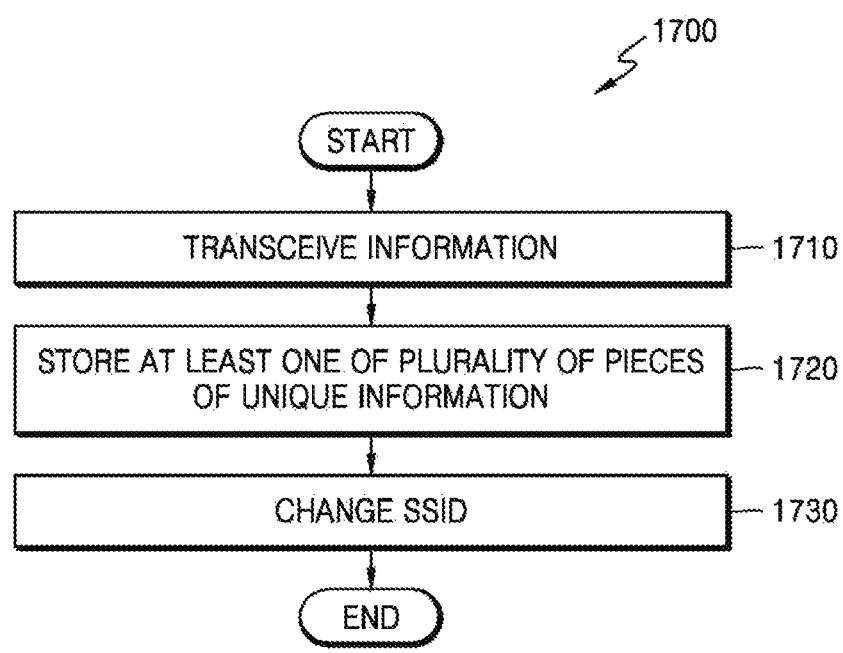
FIG. 17 is a flowchart illustrating an example method of setting a display device.

FIG. 17 is a flowchart illustrating an example method of setting a display device. The method of setting a display device according to the example embodiment is a method for setting an SSID. Since the method of setting a display device according to the example embodiment is the same as operational and constitutional characteristics of the display devices according to the example embodiments described with reference to FIGS. 2 to 16D, descriptions of a method 1700 of setting a display device identical or similar to the descriptions of FIGS. 2 to 16D will be omitted. The method 1700 of setting a display device will be described with reference to the display device 610 illustrated in FIG. 6.

Referring to FIG. 17, according to the method 1700 of setting a display device, the display device 610 which is able to communicate with the at least one other display device 620, 630, and 640 present in the network 600 receives unique information used in identification of each of the at least one other display device and an SSID from each of the at least one other display device 620, 630, and 640 (operation 1710). Operation 1710 may be performed, for example, by the communicator 612.

At least one piece of the unique information received in operation 1710 is stored (operation 1720). Operation 1720 may be performed by the memory 613. In other words, each of the plurality of display devices 610, 620, 630, and 640 connected to the network 600 may receive and store MAC addresses and SSIDs of the other display devices. For example, the controller 615 may be configured to perform control so that unique information of at least one other display device whose SSID is identical to the SSID 616 of the display device 610 among the at least one other display device 620, 630, and 640 is stored in the memory.

When the storage operation of operation 1720 is finished, an SSID of the display device 610 may be changed based on a comparison between unique information of the display device 610 and the at least one piece of unique information received in operation 1710 (operation 1730). Operation 1730 may be performed by the controller 615. When there is a display device whose SSID is identical to the SSID 616 of the display device 610 among the other display devices connected to the network 600, the controller 615 may or may not change the SSID 616 of the display device 1610 so that the respective display devices connected to the network 600 may have different SSIDs from each other.

As described above, in the example embodiment, when a plurality of display devices are connected to a network, each of the display devices may overcome the problem of duplication of an SSID between the plurality of display devices through a comparison operation between unique information. For example, without using an additional server or external device for solving the problem of duplication of an SSID, the respective display devices may readily and rapidly change their SSIDs which are identical to SSIDs of other display devices.

Accordingly, it is possible to overcome problems which may occur due to duplication of an SSID between a plurality of display devices connected to a network, for example, problems which may occur when the external device 250 transmits content.

A method of setting a display device according to the example embodiment may be embodied in the form of program instructions executable by various computing tools and recorded in a computer-readable recording medium. The computer-readable recording medium may include program instructions, data files, data structures, etc., alone or in combination. The program instructions recorded in the computer-readable recording medium may be specially designed or configured for the present disclosure, or may be known to and used by those of ordinary skill in the computer software art. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, a flash memory, etc., specially configured to store and execute the program instructions. Examples of the program instructions include a high-level language code executable by a computer using an interpreter, etc. as well as a machine language code created by a compiler.

It should be understood that various example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A display device configured to communicate with at least one other display device connected to a network, the display device comprising:
   a display;
   communication circuitry configured to receive unique information and a service set identifier (SSID) from each of the at least one other display device, the unique information for use in identification of each of the at least one other display device;
   a memory configured to store at least one piece of the received unique information; and
   a controller configured to change an SSID of the display device based on a comparison between unique information of the display device and the at least one piece of unique information stored in the memory.

2. The display device of claim 1, wherein the controller is configured to store in the memory unique information of at least one other display device having an SSID identical to the SSID of the display device among the at least one other display device.

3. The display device of claim 1, wherein, when the unique information is generated in a certain-base notation, the controller is configured to change the SSID based on a value of the unique information generated in the certain-base notation.

4. The display device of claim 1, wherein, when the unique information is generated in a certain-base notation, the controller is configured to change or to not change the SSID based on a value of the unique information generated in the certain-base notation.

5. The display device of claim 1, wherein the unique information includes a media access control (MAC) address of the display device.

6. The display device of claim 5, wherein the controller is configured to compare a value of the MAC address of the display device and a value of at least one MAC address corresponding to the at least one piece of unique information, and to determine whether to change the SSID based on the comparison.

7. The display device of claim 6, wherein, when the comparison indicates that the MAC address of the display device has a largest value among the MAC addresses of the display device and the at least one other display device, the controller is configured to change the SSID.

8. The display device of claim 6, wherein, when the comparison indicates that the MAC address of the display device has a smallest value among the MAC addresses of the display device and the at least one other display device, the controller is configured to change the SSID.

9. The display device of claim 1, wherein, when at least one of the at least one other display device is added or removed at a first point in time and the SSID of the display device has been changed before the first point in time, the controller is configured to not change the SSID of the display device.

10. The display device of claim 1, wherein, when the display device is added to the network at a first point in time and there is at least one display device whose SSID has not been changed before the first point in time among the at least one other display device, the controller is configured to change the SSID based on a comparison between unique information of the at least one display device whose SSID has not been changed and the unique information of the display device.

11. The display device of claim 1, wherein, when the SSID is changed, the controller is configured to transmit information indicating the change to at least one of the at least one other display device.

12. The display device of claim 1, wherein, when the display device is added to the network at a first point in time and an SSID of each of the at least one other display device has been changed before the first point in time, the controller is configured to output a user interface screen related to the change of the SSID through the display.

13. The display device of claim 12, wherein the user interface screen includes information indicating that an SSID of each of the at least one other display device has been changed before the first point in time.

14. The display device of claim 12, wherein the user interface screen includes a user interface screen for setting whether to change the SSID.

15. The display device of claim 1, wherein the controller is configured to update the SSID based on the comparison at predefined time intervals.

16. The display device of claim 1, wherein, in response to a history where the SSID has been changed, the controller is configured to not change the SSID.

17. The display device of claim 1, wherein, when an SSID is changed in at least one of the at least one other display device, the controller is configured to output a user interface (UI) screen indicating the change.

18. The display device of claim 1, wherein, when the SSID is changed, the controller is configured to transmit information indicating the change to at least one of the at least one other display device.

19. The display device of claim 1, wherein, when another display device is added to the network or at least one of the at least one other display device leaves the network, the controller is configured to display a user interface (UI) screen indicating the addition or the departure on the display.

20. A method of setting a display device configured to communicate with at least one another display device connected to a network, the method comprising:
receiving, by the display device, unique information and a service set identifier (SSID) from each of the at least one other display device, the unique information for use in identification of each of the at least one other display device;
storing at least one piece of the received unique information; and
changing a service set identifier of the display device based on a comparison between unique information of the display device and the stored at least one piece of unique information.

\* \* \* \* \*